June 5, 1962 G. J. SAXENMEYER 3,037,698
ERROR CONTROLLED RECYCLING OF THE READOUT OF STORED INFORMATION
Original Filed Sept. 3, 1957 23 Sheets-Sheet 1

INVENTOR.
GEORGE J. SAXENMEYER
BY [signature]
AGENT

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 3

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 6

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 9

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 10

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 12

5 BIT CODE

| DIGIT | 6 | 3 | 2 | 1 | 0 |
|---|---|---|---|---|---|
| 0 | | | X | X | |
| 1 | | | | X | X |
| 2 | | | X | | X |
| 3 | | X | | | X |
| 4 | | X | | X | |
| 5 | | X | X | | |
| 6 | X | | | | X |
| 7 | X | | | X | |
| 8 | X | | X | | |
| 9 | X | X | | | |

COMPUTER OPERATION CODE CHART

| TENS ↓ / UNITS → | | 0 | 1 | 2 | 3 | 4 | 5 | 6 | 7 | 8 | 9 |
|---|---|---|---|---|---|---|---|---|---|---|---|
| 0 | + | NO OP | STOP | B S C | SIGN C | | | LD B | SET BO | SET B1 | SSS B1 |
| | − | C STOP | | RI | | | | ST B | SSS BO | SET B2 | SSS B2 |
| 1 | + | TLU | | COMP 1 | BRZ 1 | BRMN 1 | BROV 1 | RA 1 | A 1 | RAAB 1 | AAB 1 |
| | − | TLUE | | TD 1 | ST 1 | SC 1 | DC 1 | RS 1 | S 1 | RSAB 1 | SAB 1 |
| 2 | + | MULT | | COMP 2 | BRZ 2 | BRMN 2 | BROV 2 | RA 2 | A 2 | RAAB 2 | AAB 2 |
| | − | DIV | | TD 2 | ST 2 | SC 2 | DC 2 | RS 2 | S 2 | RSAB 2 | SAB 2 |
| 3 | + | DSC | | COMP 3 | BRZ 3 | BRMN 3 | BROV 3 | RA 3 | A 3 | RAAB 3 | AAB 3 |
| | − | | | TD 3 | ST 3 | SC 3 | DC 3 | RS 3 | S 3 | RSAB 3 | SAB 3 |
| 4 | + | | AD BZ 4 | COMP 4 | BRZ 4 | BRMN 4 | BROV 4 | RA 4 | A 4 | RAD 4 | AD 4 |
| | − | | COMP D4 | TD 4 | ST 4 | SC 4 | DC 4 | RS 4 | S 4 | RSD 4 | SD 4 |
| 5 | + | | AD BZ 5 | COMP 5 | BRZ 5 | BRMN 5 | BROV 5 | RA 5 | A 5 | RAD 5 | AD 5 |
| | − | | COMP D5 | TD 5 | ST 5 | SC 5 | DC 5 | RS 5 | S 5 | RSD 5 | SD 5 |
| 6 | + | | AD BZ 6 | COMP 6 | BRZ 6 | BRMN 6 | BROV 6 | RA 6 | A 6 | RAD 6 | AD 6 |
| | − | | COMP D6 | TD 6 | ST 6 | SC 6 | DC 6 | RS 6 | S 6 | RSD 6 | SD 6 |
| 7 | + | | | | | | | | | | |
| | − | | | | | | | | | | |
| 8 | + | TC | RD 1 | RD 2 | RD 3 | RD 4 | | | | | |
| | − | | CRD 1 | CRD 2 | CRD 3 | CRD 4 | | | | | |
| 9 | + | DMC | P 1 | P 2 | P 3 | P 4 | | | | | |
| | − | | SPP 1 | SPP 2 | SPP 3 | SPP 4 | | | | | |

FIG. 11.

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 20

June 5, 1962 G. J. SAXENMEYER 3,037,698

ERROR CONTROLLED RECYCLING OF THE READOUT OF STORED INFORMATION

Original Filed Sept. 3, 1957 23 Sheets-Sheet 23

United States Patent Office 3,037,698
Patented June 5, 1962

3,037,698

ERROR CONTROLLED RECYCLING OF THE READOUT OF STORED INFORMATION

George J. Saxenmeyer, Vestal, N.Y., assignor to International Business Machines Corporation, New York, N.Y., a corporation of New York Continuation of application Ser. No. 681,849, Sept. 3, 1957. This application Mar. 17, 1960, Ser. No. 15,765
18 Claims. (Cl. 235—153)

The invention is related generally to computers of the type capable of effecting a wide variety of arithmetic and logical operations. More specifically, the invention is concerned with the provision of means for repeating, or recycling, a specific operation in process upon the development of an error in the transmission of data or instructions, pertaining to the operation in process, along the principal transmission channels of the computer. The recycling operations are repeated for as long as the error persists within a fixed interval of time, determined by a recycle timer, upon the termination of which, if the error has not cleared up, the computer stops. The duration of the interval may, of course, be set to any desirable time value consistent with what may be considered to be sufficient for the error to efface itself. By virtue of this novel concept, the computer in effect automatically attempts to rid itself of the error by repeating or recycling the operation in process for as long as it may be necessary within the allotted interval of time.

This application is a continuation of our application Serial No. 681,849, filed September 3, 1957, now forfeited.

The principal object, therefore, resides in the use of a novel concept in the computer art whereby computer lost time, heretofore attributable to transmission errors, is virtually eliminated.

Another object resides in the provision of recycling instrumentalities in a computer whereby computer operations in general may be carried out in a more expeditious manner without loss of computer time attributable solely to elusive type of transmission errors.

A more specific object resides in the provision of recycling means for recycling arithmetic operations in the event of an error in data transmission whereby the effect of arithmetic operation time of the computer is increased.

Another specific object resides in the provision of recycying instructional data pertaining to logical operations of the computer for effectively increasing the operational time of the computer.

Still another specific object resides in the provision of means for recycling the computer during table lookup operations in the event an error develops during an argument search, whereby the table lookup error is located in a most expeditious manner.

Yet another object resides in the provision of recycling means for recycling the computer upon the occurrence of an error during an address or instruction modification rountine to enable the routine and the logical operations attending the same are effected most expeditiously.

The foregoing and other objects, features and advantages of the invention will be apparent from the following more particular description of a preferred embodiment of the invention, as illustrated in the accompanying drawings.

In the drawings:

FIG. 11 is a chart showing the various operation codes of the computer.

Figure 23A:
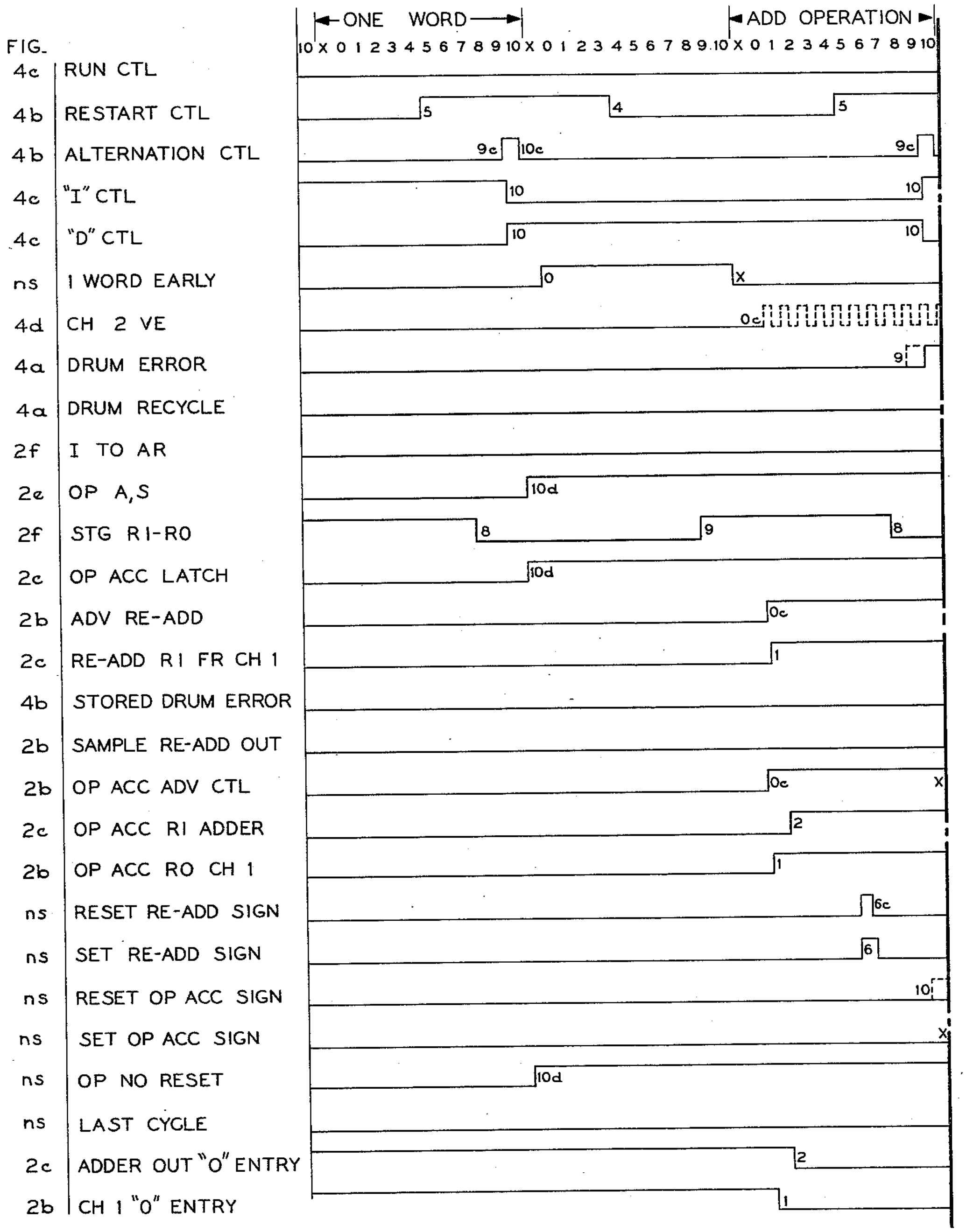
Figure 23B:
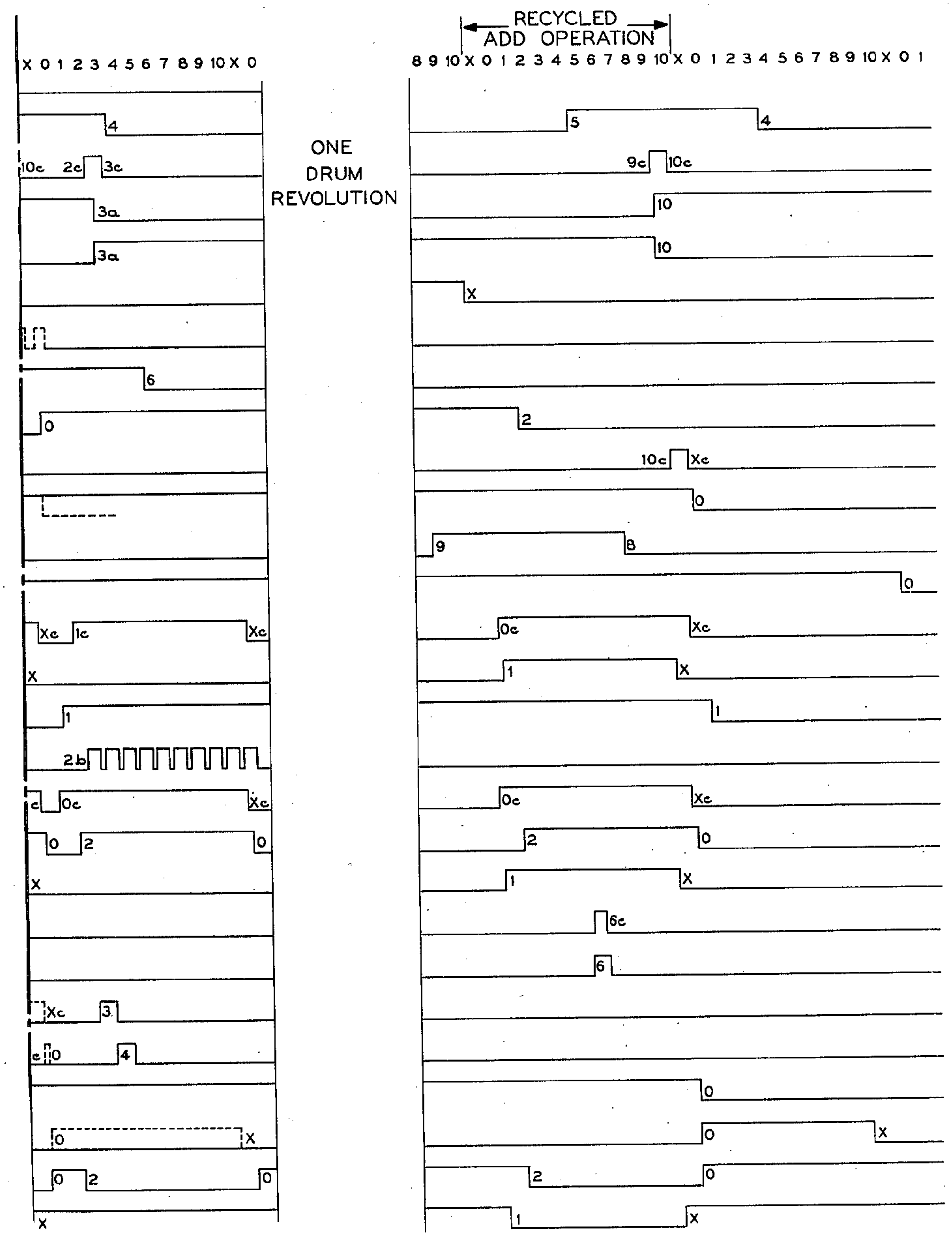

FIGS. 23*a*–23*b* represent a sequence chart of the principal control signals employed in the operation of the invention.

Figure 24:
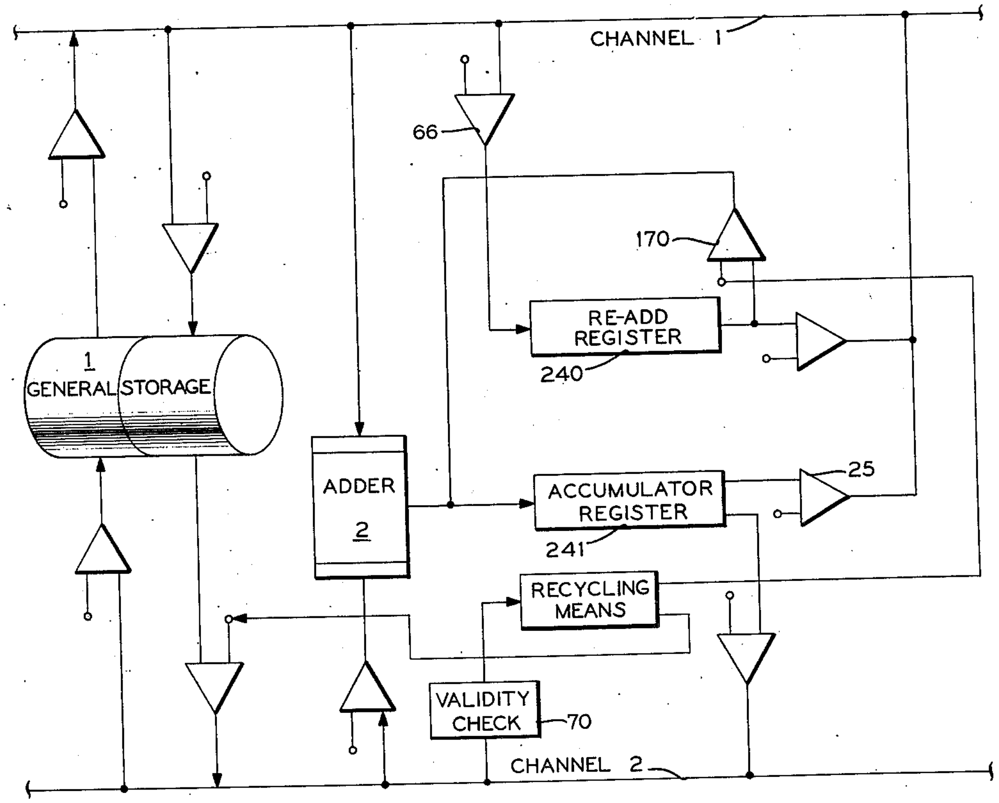
Figure 1:
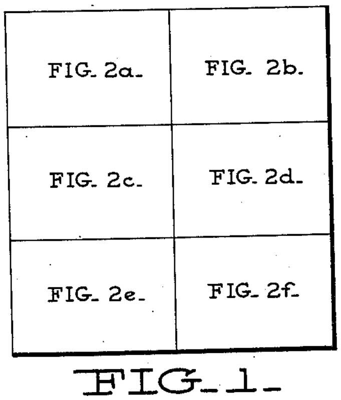
FIG. 1 shows how
Figure 3:
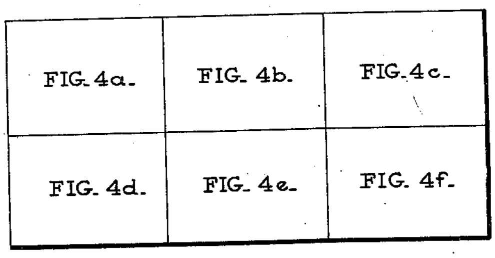
FIG. 3 shows how

FIG. 24 is a schematic drawing of one of the principal features of the invention.

*Data Flow and Program Control*

The general logical arrangement, the principal functional units and various paths of data flow are shown in FIGS. 2*a*–2*f*. The various electronic components and timing gates used in the computer logic are described in a later section under Computer Components.

It should be mentioned that all data flow paths, in FIGS. 2*a*–2*f*, are shown as single lines in the interest of simplification and clarity. Each data flow path is actually comprised of five parallel bit lines. In accordance with the two-out-of-five code system, data pulses, representing valid numerical data, are present on two of these five lines during each digit interval.

Figures 5, 6:
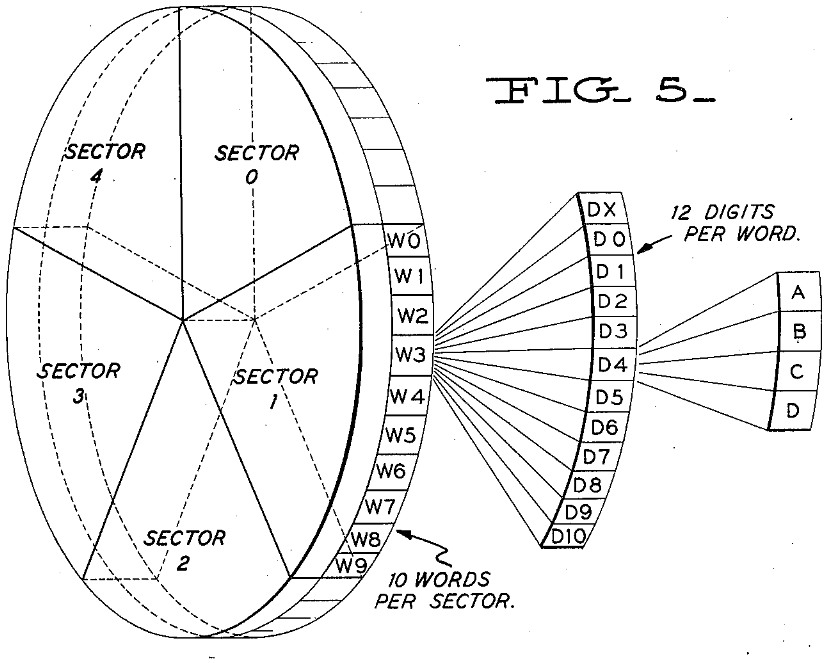
FIG. 5 shows generally how the computer drum surface is divided with respect to sectors, words, digits and A—B—C—D pulses.
FIG. 6 shows the five bit data code employed in the computer.

Original data and instructions are entered into the computer storage from IBM cards punched according to the well-known IBM code and, upon entry, the data and instructions are converted into the two-out-of-five code. FIG. 6 shows how the two-out-of-five code combines the various bit representations for each of the ten decimal values 0–9.

Figure 2A:
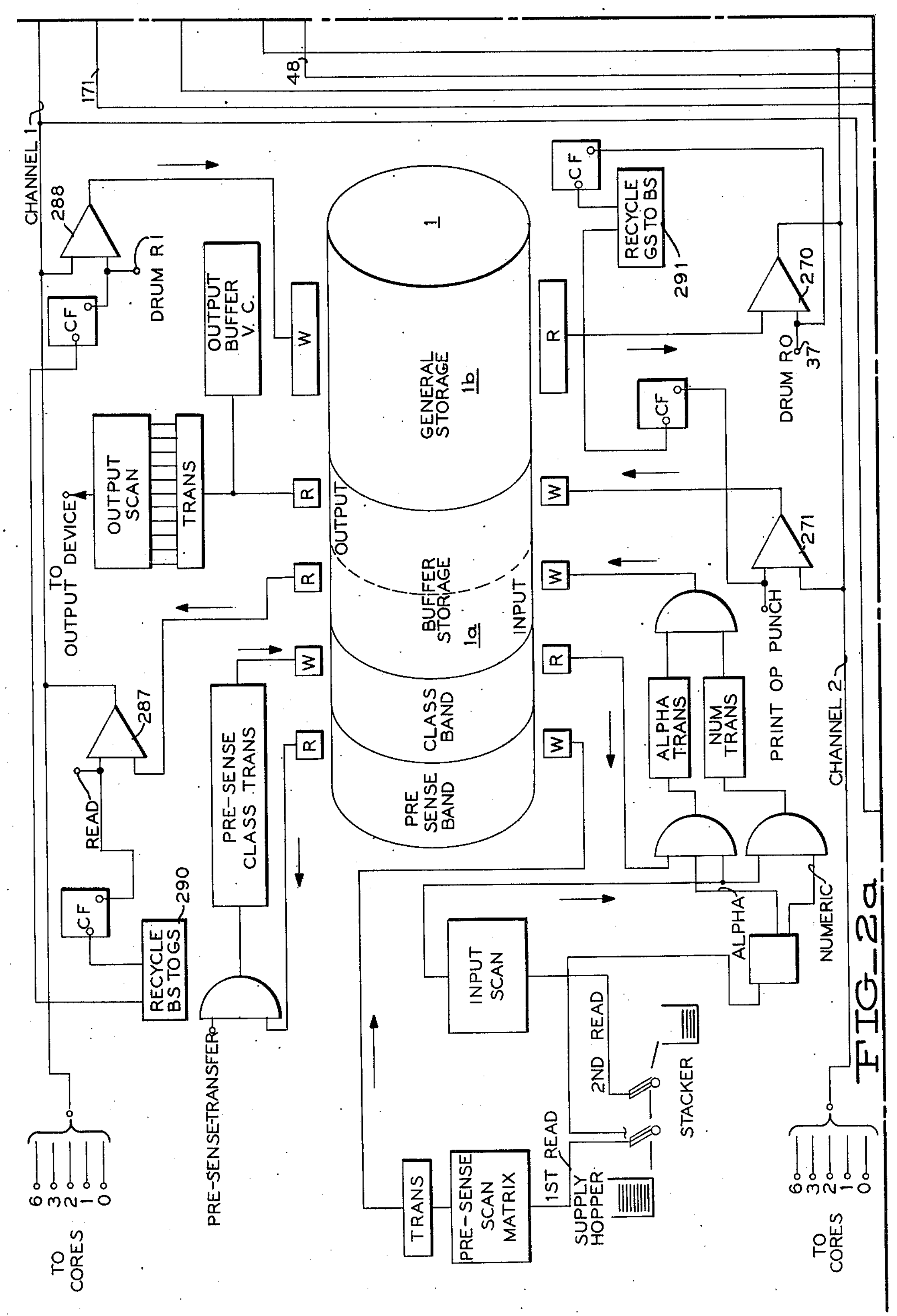
FIGS. 2*a* through 2*f* are arranged to form a composite data flow diagram of the computer.
Figure 2B:
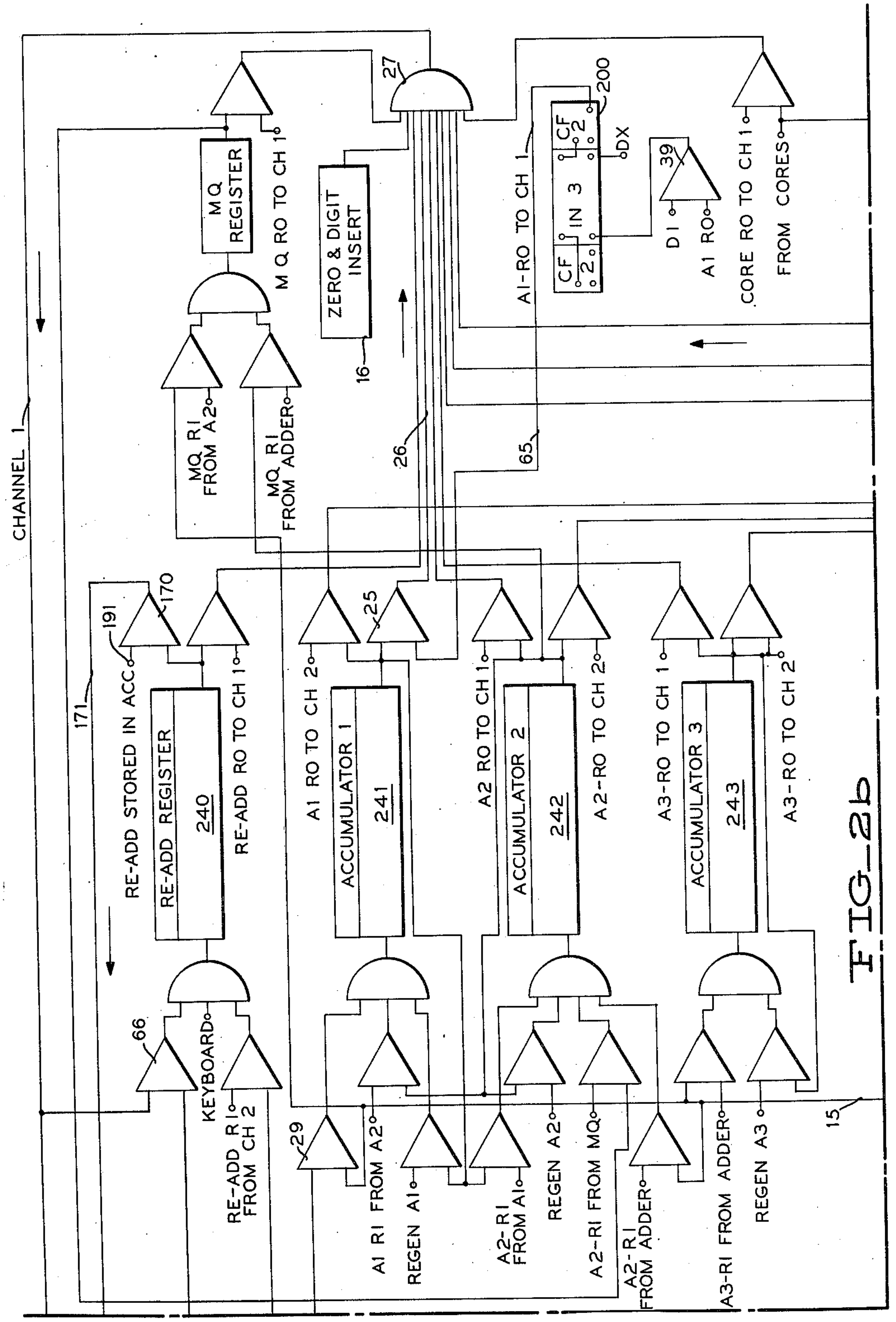
Figure 2C:
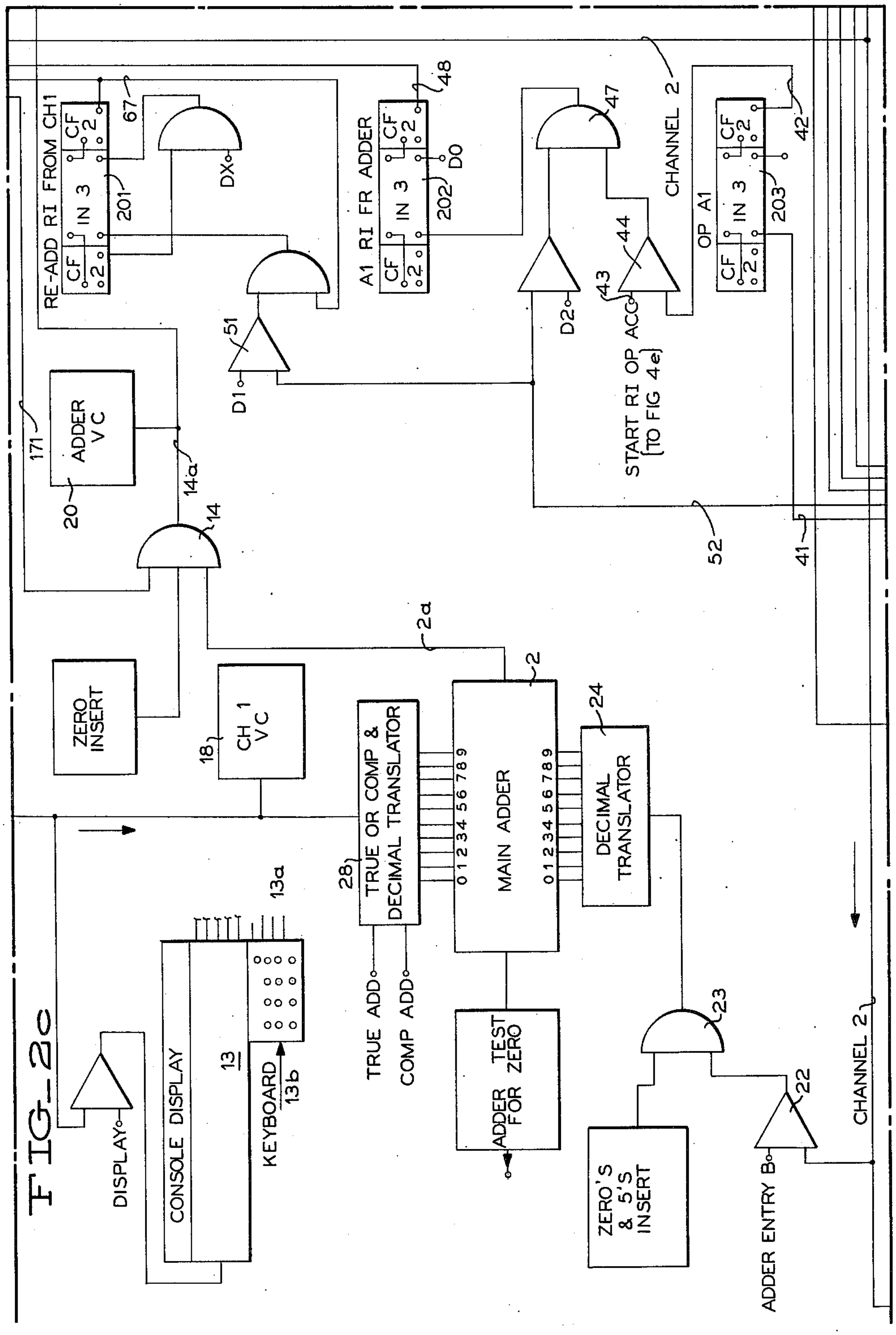
Figure 2D:
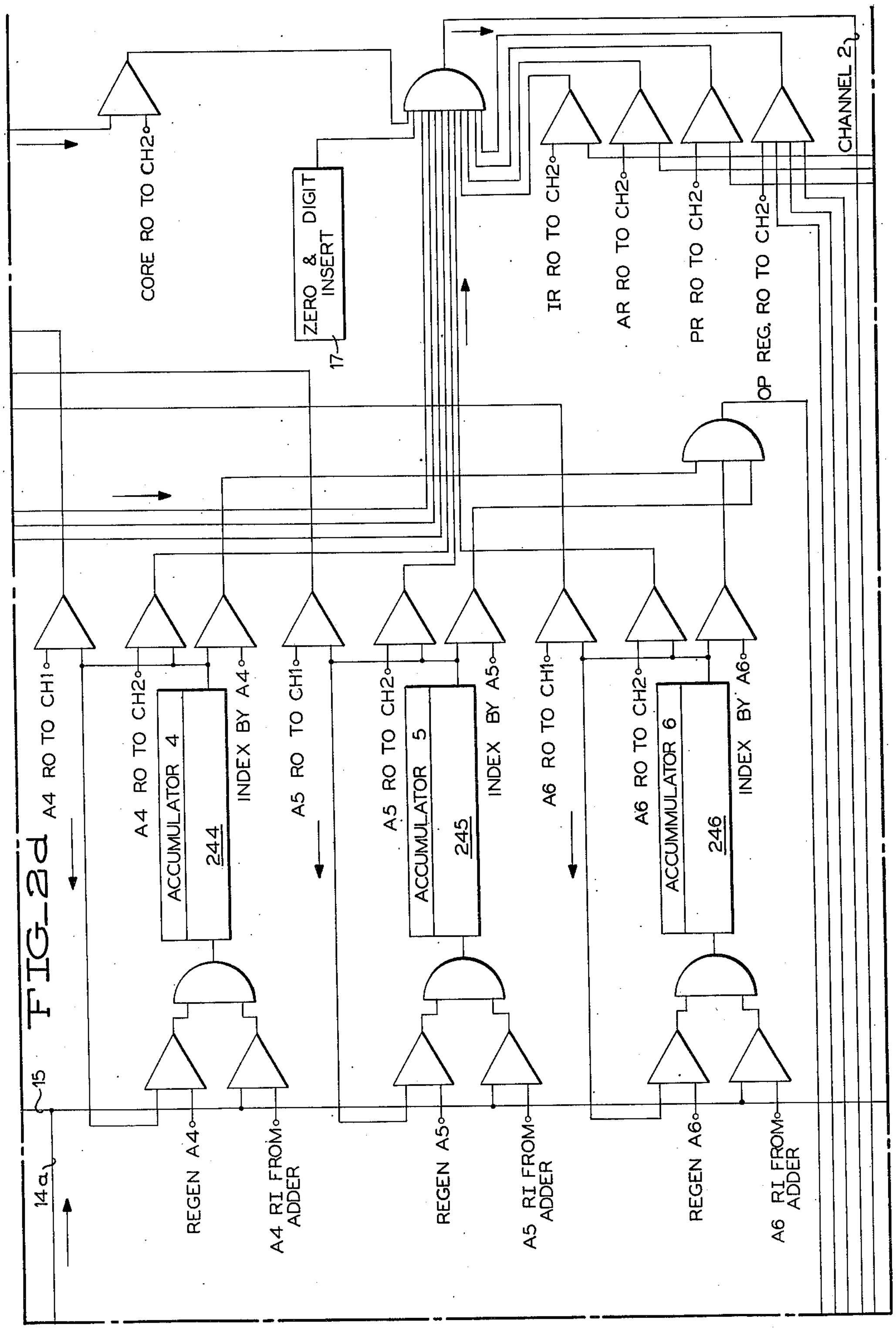
Figure 2E:
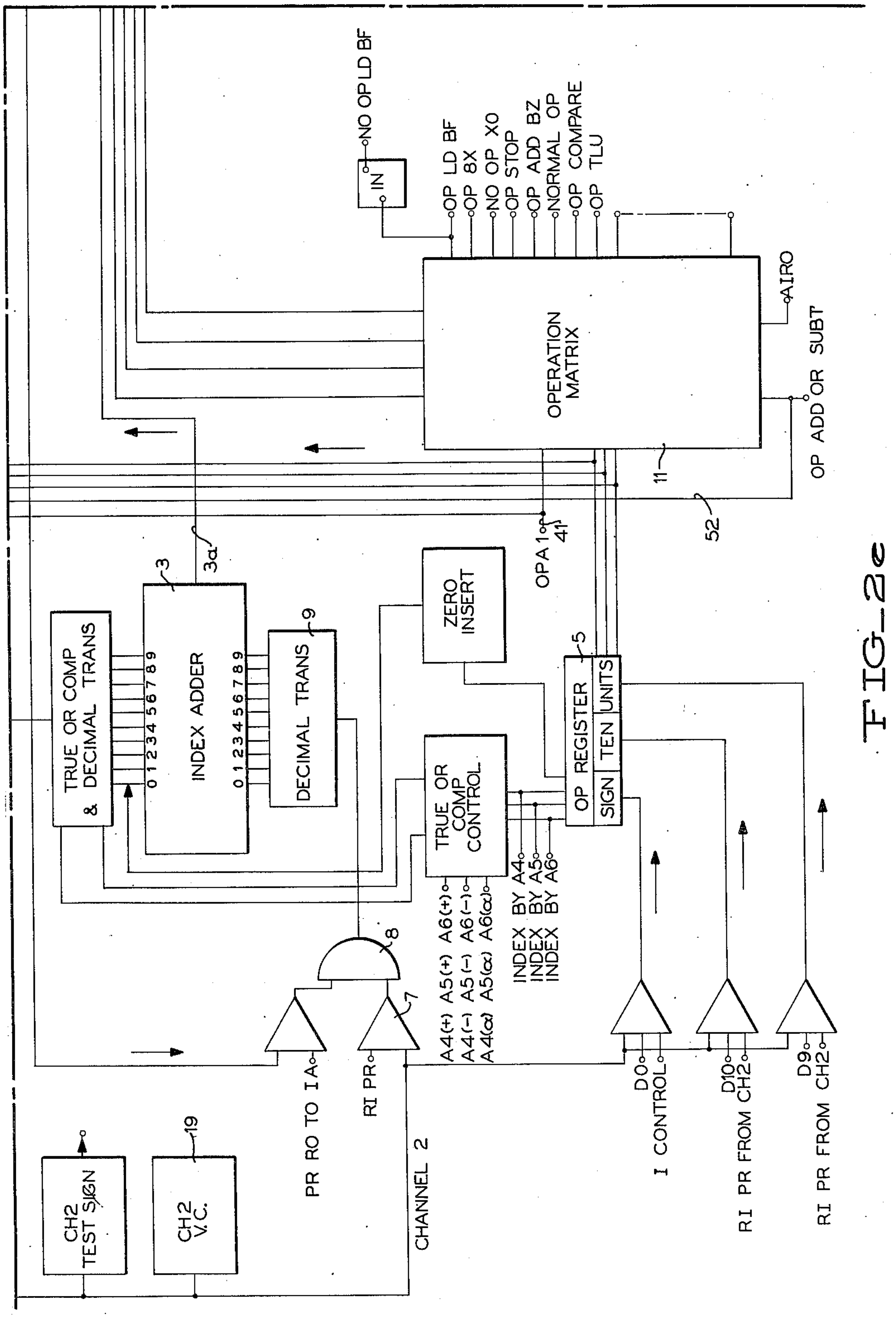
Figure 9:
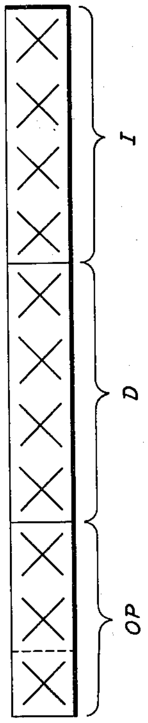
FIG. 9 shows how an instruction word is constituted.
Figure 10:
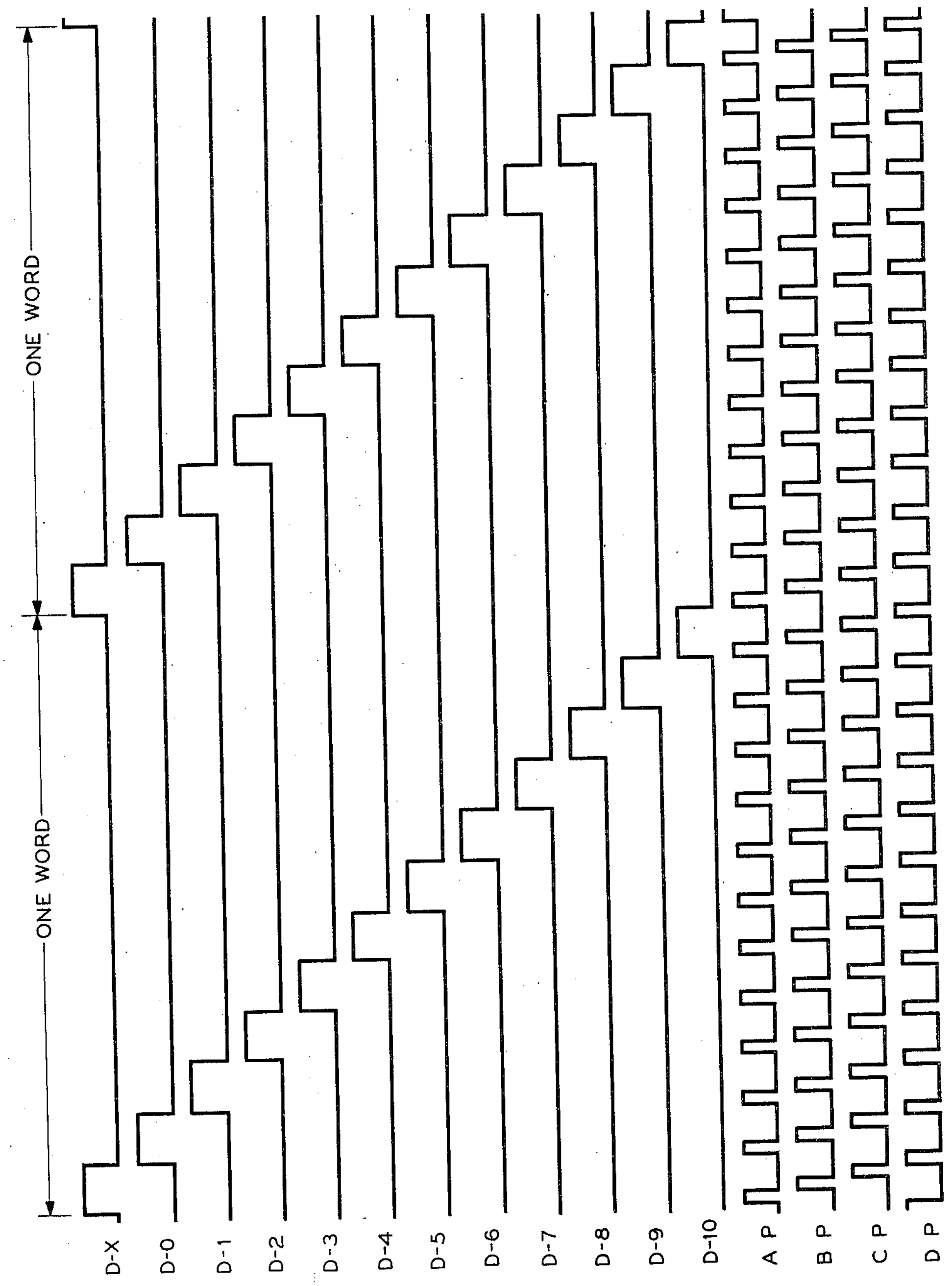
FIG. 10 is a time chart showing the relationship of the digit gates and the A—B—C—D pulse gates with respect to the word time.

The various arithmetic and logical operations that the computer can be programmed to perform are carried out by various accumulators 240 through 246 in FIGS. 2*b* and 2*d*, a Main Adder 2 in FIG. 2*c* and an Index Adder 3 in FIG. 2*e*. The operations of these units are controlled by a program control circuit which includes a program register 4 in FIG. 2*f*, an operation register 5 in FIG. 2*e* and an address register 6 in FIG. 2*f*. Each program step is effected under control of an appropriate command or instruction of the kind shown in FIG. 9. Each instruction is in the form of an 11-digit word including sign. This instruction word is divided into an operative portion (OP) of three digits including the sign, an address portion (D) of four digits, and an instruction portion (I) of four digits. The operation portion instructs what arithmetic or logical operation is to be performed. The D portion specifies the storage location where the factors involved in the operation are to be found and the I portion of the instructions specifies the location of the next instruction.

Figure 2F:
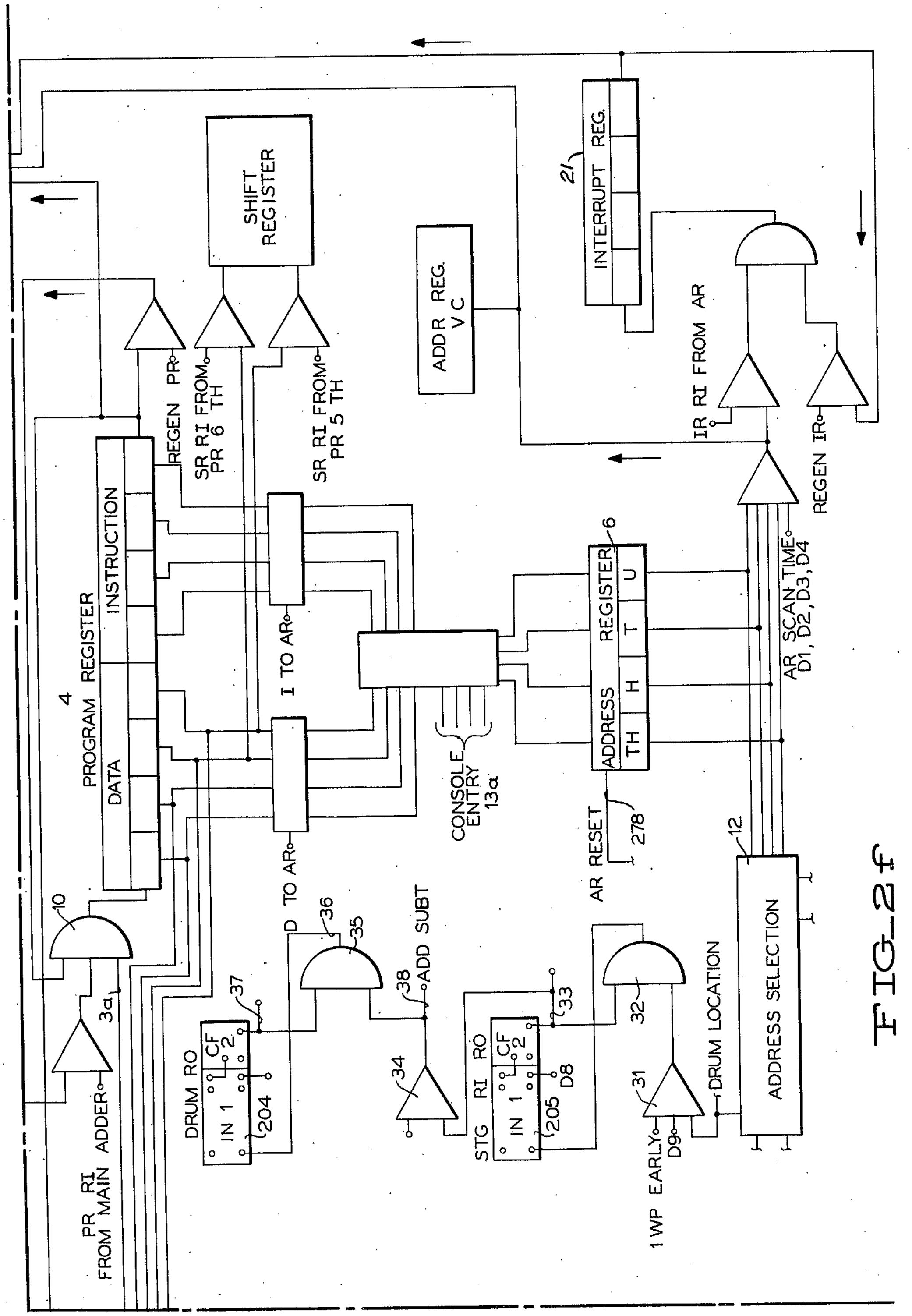

The D and I portions of an instruction are read from the Drum 1 in FIG. 2*a*, along Channel 2, a switch 7 in FIG. 2*e*, a Mix 8, a decimal translator 9, an Index Adder 3, the index adder output line 3*a*, a Mix 10 in FIG. 2*f* and into the Program Register (PR) 4. The operation portion of the instruction is read along the same channel but is directed into the OP Register (OP R) 5 in FIG. 2*e*.

The outputs from the data portion of the PR4 and the output from the OP R5 are analyzed by means of an Operation Matrix (OP M) 11 in FIG. 2*e* to provide the various operation control signals needed by the computer to perform its various arithmetic and logical operations.

The operation matrix consists primarily of diode switching circuits which match combinations of outputs of the operation register with timing pulses and gates and signals from a control commutator, which, as explained later on, is a two position ring, to provide signals which allow the machine to function in accordance with the meaning of the operation code of an instruction.

The Address Register (ADDR R) 6 of four positions is under control of appropriate gate signals to receive, first, the I portion of the instruction and, thereafter, the D portion of the instruction. The outputs of the ADDR R6 are analyzed by means of Address Selection means 12 to locate the data and instruction of a program routine.

Each program step is performed in two parts. On the first part, or I half-cycle, an instruction address in the program register is read out to the address register. The address register interprets the I portion of the instruction to select the location specified by the I address. This instruction word is read out of general storage (i.e., the Drum) onto Channel 2, through the index adder and into the program register as described.

On the second part of the program step, or D half-cycle, the data portion of the program register is read into the address register. Here the D address is interpreted and used to select a data address word which is to be operated upon. The operation code is then interpreted and activates the operation which is to be performed using the specified data word. At this point an interlock prevents program advance until after the program step has been completed.

The half-cycle operations, by which a program step is performed, is accomplished by means of a program control commutator. The commutator controls the sequence of actions necessary to advance through any program step. This control commutator is a 2-position branched ring. As it cycles, it alternately advances through each position. One position controls the functions of the I half-cycle, while the other position controls the function of the D half-cycle. Normally the ring must advance through both positions, first the I and then the D to complete a program step. Each position of the control commutator is used to control the various transfers of data required for the accomplishment of the program step. The more detailed aspects of the D and I cycles as well as the program controls are described under a separate section entitled Program Controls.

The main function of the program register 4, in FIG. 2*f*, is to hold the eight digits of the instruction word that it receives from the I address location, and supply the proper part of this word to the operation matrix and the address register for interpretation at the proper time.

The operation register 5 is a 2-position static storage unit. Each position uses five latches to indicate the operation code value in two-out-of-five code form. The OP register accepts information at digit 9 and digit 10 times of an I half-cycle operation. Once an OP code is entered, a continuous output is available from four of the ten latches until the register is reset. These outputs are used for coincidence switching to control the indicated operation.

The OP R5 is further adapted to analyze the sign of an instruction and to provide, in accordance with the chart shown below, appropriate controls for indexing operations, which operations are often referred to as address modification, and involve the use of Index Accumulators 4, 5, and 6 (referenced as 244, 245 and 246), and the index adder 3 to modify either or both the D and I portions of an instruction, as the latter is fed to the index adder while the contents of an index accumulator is also being fed to the index adder. The results from the index adder provide the modified instructions with no loss of machine time.

| Decimal value | Sign | Index Designation |
|---|---|---|
| 0 | + | No Index. |
| 1 | + | Index by Accum. #4. |
| 2 | + | Index by Accum. #5. |
| 3 | + | Index by Accum. #6. |
| 4 | not used | |
| 5 | (Alpha) | |
| 6 | − | No Index. |
| 7 | − | Index by Accum. #4. |
| 8 | − | Index by Accum. #5. |

The combination of a plus or a minus sign, together with the two numerical OP code positions provide for a maximum of approximately 200 operation codes, which codes are used to specify various types of operations performed by the computer. Most of these codes are shown in the chart of FIG. 11.

The Address Register 6 in FIG. 2*f* is a 4-position static storage unit. It can accept information from positions 5–8 of the program register on a D half-cycle or from positions 1–4 on an I half-cycle. It can also accept information from the computer console unit 13 by way of appropriate lines 13*a*. The outputs from the address register 6 are analyzed by means of the address selection means 12 to select statically, in a manner to be more fully described hereinafter, under Drum Address Selection, the proper drum storage band for reading out the I and D portions of addresses. The address register outputs are also switched with the proper timing pulses to select the proper word time for reading from or writing into statically selected general storage bands of the drum.

The computer storage locations are controlled by four digit addresses, each of which specifies a particular storage location within the system. The storage locations are addressed as follows:

| Word Address: | Location |
|---|---|
| 0000–3499 | Drum storage. |
| 3600 | Console. |
| 3601–3606 | Accumulators. |
| 3607 | Interrupt register. |
| 3608 | Restart address. |
| 3609 | Card interrupt. |
| 3610 | Card interrupt. |
| 4000–4999 | Core storage. |

The accumulators 241–246 are each of the core shifting type which receive and issue data serially by digit and parallel by bit. As seen in the flow diagram in FIGS. 2*b* and 2*d*, all six accumulators have output access to either Channels 1 and 2. Each accumulator also has a regeneration path. Input data is supplied to each accumulator by way of lines 2*a*, 14*a* and 15 connected to the output of the main adder. The accumulators are controlled by operation codes or can be addressed during the course of a program routine. On some arithmetic operations; for instance, multiplication or division, accumulators 1 and 2 are coupled together in order to form a 20-digit accumulator. This allows data to travel from one accumulator to the other depending upon the application for which it is being used.

Accumulators 4, 5 and 6, as mentioned, are used for indexing operations and may also be used for the normal arithmetic operations. When an index operation is sensed, the contents of the indexed accumulator are sent to the 1-digit index adder 3 where they are automatically added to an instruction to modify the address. The output of the index adder 3 is sent along the line 3*a* to the program register 4 where it is used to determine the location of the next instruction.

The accumulators together with the main adder provide for accumulating sums, products, quotients and in performing shift operations. The accumulators also supply overflow signals to the program control circuits for logical test operations. The accumulators also function as addressable sources of information to supply instruction words or data words for programming purposes.

Whenever an accumulator is specified by an operation code, the contents of this accumulator reads out to Channel 1. If the accumulator is specified by the data address, the contents of this accumulator reads out to Channel 2. Both channels have continuous zero inserts 16 and 17 at all times when data is unavailable in order to satisfy the channel validity checks. The validity check for Channels 1 and 2 are controlled by means of validity check units 18 and 19, seen in FIGS. 2*c* and 2*e*, respectively. The moment an operation needs the use of the channels, zeros are inhibited as significant data is inserted.

The Main Adder 2 is a core matrix capable of receiving and analyzing the two input digit values and producing a digit output signal equal to the sum of the two inputs. Data input to the main adder may be supplied by means of the accumulators, general storage and core storage. The output of the 1-digit adder is stored back in the accumulators. A delay of one digit time is incurred between input to and output from the adder. An output is available from the adder as a result of enrty of two input digits, one on each adder entry line. The output of the adder is always zeros, when the adder is not in operation, this being necessary in order to satisfy the adder validity check means 20. Channel 1 input to the adder is considered to be adder entry A; and Channel 2, adder entry B.

The control console 13 is used to provide direct communication with the computer system. The console contains decimal-type display tubes for displaying data from any addressable location. Neon-type lights are used as operation and checking indicators. In addition, a keyboard 13*b* is used to facilitate manual addressing and entry into the accumulators or other storage locations.

*Automatic Error Restart*

An automatic error restart feature on the computer is used to allow the computer to transfer from a main program routine to an error correction routine whenever an error is sensed. This error routine may be used to determine the type of error and provide for another attempt to perform the operation.

If an error occurs, an error restart signal is developed, causing either an automatic stop or an automatic error correction cycle. This operation is controlled by a console Error Sense Switch which has two positions; namely, Error Stop and Error Sense. When the switch is set to Error Stop, the computer comes to an immediate stop whenever any error is detected. When the switch is set to Error Sense, and an error is detected, the computer transfers from the main program routine to the error correction routine. However, if a clocking, drum write, input or output error is detected, the computer will stop with the switch in the sense position; with the switch in the Error Sense positions, console Restart Address switches, of which there are four, are then used to specify the location of the first instruction of the error routine.

*Card Interrupt*

A 4-position Interrupt Register 21 in FIG. 2*f*, in addition to the necessary logic means, is provided to carry out interrupt routine operations in a most expeditious manner. The card interrupt feature enables the computer to automatically perform a computer and an auxiliary card machine operation simultaneously. The scheduling for these parallel operations is arranged automatically within the computer. The card interrupt feature is controlled by either of two appropriate groups of switches on the computer console. Each set of switches is divided into an interrupt control switch, a drum synchronizer selection switch and four address selection switches. The interrupt control switch is used in determining whether a tape interrupt or a card operation is to be performed. The drum selection switch assigns and sets the input or output synchronizer that is to operate on an interrupt basis. The address selection switches are set by the operator to specify the location of the initial instruction of the interrupt routine that is to be used. During a program routine, an operation code can be used to cause an input or output device to read, print or punch. This OP code starts the input or output device while the main routine continues in operation. When the input or output machine has completed its operation, an interrupt signal can break into the main routine at the completion of the data portion of the instruction word. The location of the first instruction of the interrupt routine is found in the card interrupt switches. The selection of the proper card interrupt switches is automatically determined within the computer. In order to set the computer back to the main program routine, the last instruction of the interrupt operation must be a release interrupt instruction. The data portion of this instruction resets the interrupt circuitry used to control the input or output interrupt. If the I (instruction) portion of the address is 3607 (interrupt register address), the control is returned to the main routine at the point where the interrupt routine was initiated. Any other I address in the Release Interrupt Instruction will release the program controls to a routine starting at the specified I address.

The computer employs a system of stored programming to provide the necessary sequence of operations for the solution of a problem. The computer refers to any of its storage locations to obtain a previously stored or computed 10-digit coded instruction word whose digit values can be interpreted by the machine to determine the next operation.

Original data and instructions are stored in drum storage locations from punched cards during a preliminary loading process. Additional data and/or instructions may be inserted from cards during the solution of the problem. Each instruction (program step) is stored as a word. Because both data and instructions are stored in the same manner, an instruction word can be subject to arithmetic operations and can be altered by programming. The meaning of any valid coded instruction is built into the machine. Any sequence of instructions is called a program or program routine. All instructions are in the form of 10-digit words. The sign is used to determine the operation code but is not considered when the instruction word is altered arithmetically during address modification; i.e., indexing.

*Drum Address Selection*

The address register contains the 4-digit address in two-out-of-five code form. The head selection circuits for the drum select the three heads of a drum band for reading or writing by interpreting the meaning of the address register output. The function of each address register position for static selection is as follows:

The thousands position of the address register is analyzed for a decimal value of 0, 1, 2, 3. This divides the drum into four groups. The 0XXX group (for words 0000–0999), the 1XXX group (for words 1000–1999), and the 2XXX group (for words 2000–2999), each contain a thousand words or 20 bands. The 3XXX group (for words 3000–3499) contains 500 words or ten bands because of space limitations on the drum.

The hundreds position of the address register may contain values for 0 through 09 and, therefore, has ten selection signals possible. Each signal locates a hundred words of two bands within each thousand group. Words in a given band will be XX00 to XX49, or XX50 to XX99. For selection, they are termed 00 band and 50 band.

The tens position of the address register may also contain values 0 through 9 but only two selection signals (00 band or 50 band) are required. The 0, 1, 2, 3 and 4 values are grouped to develop the XX00 signal and the 5, 6, 7, 8 and 9 values are grouped to give the XX50 signal.

The units position of the address register has no bearing on static selection but is used in dynamic selection.

| | |
|---|---|
| "0" in Th—0XXX—20 of 70 bands<br>"1" in Th—1XXX—20 of 70 bands<br>"2" in Th—2XXX—20 of 70 bands<br>"3" in Th—3XXX—10 of 70 bands | Th |
| "0" in Hds—<br>"1" in Hds—2 of 20 bands or —2 of 10 bands<br>"9" in Hds—depending on Ths group | H |
| 0, 1, 2, 3, 4 in tens—XX00—1 of 2 bands<br>5, 6, 7, 8, 9 in tens—XX50—1 of 2 bands | T |
| Not used | U |

The static selection circuits are set up as a 2-dimensional matrix. The (2) tens position selection signals are switched with the (10) hundreds position selection signals. This switching is termed vertical selection and locates four bands. That is, band X350 may be in one of four thousands groups. The thousands position selection signal (termed horizontal selection) picks out the particular band addressed.

The vertical selection (tens and hundreds position) applies voltage to the plates of the record and erase tubes through the proper heads. Diodes eliminate back circuits through heads not selected by vertical selection.

The horizontal selection (thousands position) selects the grid of proper thousands tube to write in the proper heads.

The vertical selection circuits are used for both reading and writing and sometimes may be referred to as bringing up the heads.

*Dynamic Selection*

After a band has been selected, a one word early circuitry selects the one of fifty words in the band. For dynamic selection and other timing purposes the drum is divided into five sectors (0–4) of ten words (0–9) each. The units and tens position of the address register are used for locating the correct word and sector.

| | |
|---|---|
| Not used (in dynamic selection) | Th. |
| Not used | Hund. |
| Determine sector 0 or 5—S0, 1 or 6—S1, etc | Ten |
| Determine word within sector 0—W0, 1—W1, 2—W2, etc | Units |

The one word early circuitry mentioned above provides for setting up circuitry one word in advance of the time that the word selected for an arithmetic or logical operation is to be used.

The one word early circuitry consists primarily of diode switching logic whose components are comprised essentially of switches and mixes. This switching logic provides a gate signal one word in advance of the time it will be used. This logic circuit thus avoids a timing condition which otherwise would bring failure in operation due to the inherent variations in the timings of the various signal issuing devices of the machine.

For more detailed description of this circuitry and for the various timing gates and controls described, reference is invited to the Hamilton et al. copending application, Serial No. 544,520, filed November 2, 1955, and assigned to the common assignee.

*Computer Components*

The following explains in general the functions of the various electronic components used throughout the computer circuitry. These components include, among other things, such units as inverters, double inverters, cathode followers, switches (AND devices), mixes (OR devices), latches, double latches, latch rings, grounded grid amplifiers, etc., and are used in much the same manner as similar components are used in the Hamilton et al. application, Serial No. 544,520, filed November 2, 1955, and assigned to the common assignee.

Figure 13:
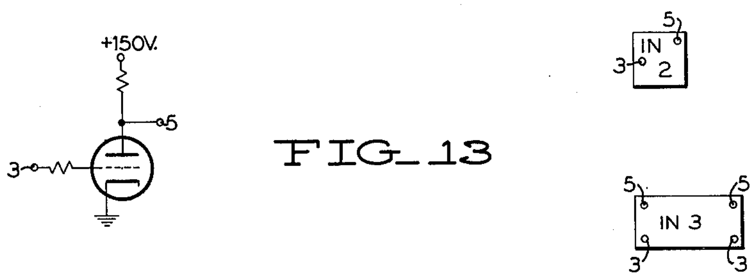
FIG. 13 shows an electric circuit configuration and two block representations therefor of one type of a single inverter.
Figure 20:
FIG. 20 shows an electric configuration constituting another type of an inverter and the appropriate block representation, IN4, therefor.
Figure 21:
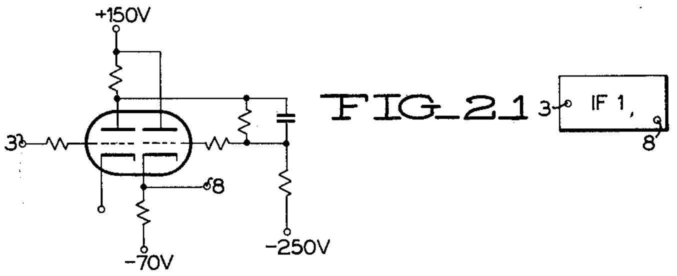
FIG. 21 shows an electrical configuration constituting an inverter and a cathode follower and the appropriate block representation, IF1, therefor.

An inverter is basically a triode adapted to reverse the polarity of a signal applied to its grid, the output signal being taken off the plate. The voltage levels between which the inverter output signal swings are relatively high, typical values being from +150 to +50 volts. The circuit and block representations therefor are shown in FIGS. 13 and 20.

Figure 12:
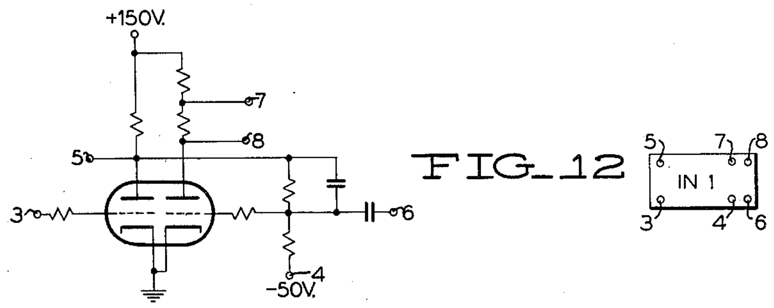
FIG. 12 shows an electric circuit configuration and the block representation, IN1, therefor of one form of a double inverter.

A double inverter is merely two coupled inverter stages where the plate output signal of the first inverter drives the grid of the second inverter. The signal is inverted twice so that the final output is of the same phase as the input signal. The coupling between stages may be direct or capacitive. In the former, the output signal has the same duration as the input. In the latter, an impulse output signal is obtained even though the input may be of relatively long duration. The circuit of a double inverter and the block representation therefor are shown in FIG. 12.

In the computer, inverters are largely used to restore the level of signals that have been altered by passage through diodes and cathode followers. The output signal of a double inverter is usually used to operate the grid of a cathode follower whose output is characterized as a low level, low impedance signal.

Figure 14:
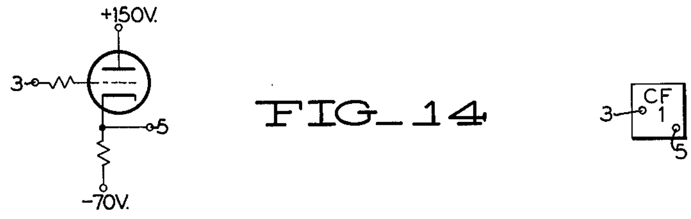
FIGS. 14, 15 and 16 show three different electric configurations of cathode followers and three appropriate block representations therefor; namely, CF1, CF2 and CF3, respectively.
Figure 15:
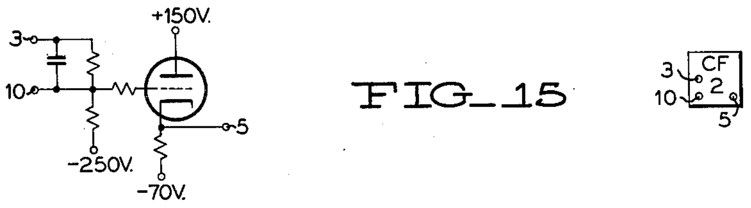
Figure 16:
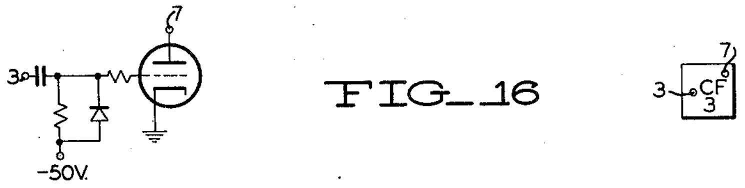
Figure 17:
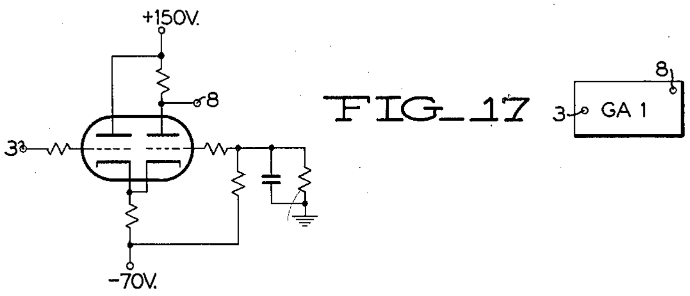
FIG. 17 shows an electric configuration and the block representation therefor of a grounded grid amplifier.

The cathode follower is basically a triode used primarily as indicated above, the output being taken from the cathode. Several types of cathode followers are employed using a particular type, depending upon circuit requirements, such as different load resistance variances, various type of grid dividers and grid arrangements, etc. Cathode followers are frequently used with double inverters or D.C. signal-level restoration. Cathode followers may be arranged to share a common load resistor to form a mix (OR) circuit. FIGS. 14, 15 and 16 show various types of cathode followers.

Figure 19:
FIG. 19 shows an electric configuration of diodes constituting a Switch circuit and the block representation therefor.

A switch is a coincidence device having a plurality of inputs and an output, the latter providing a signal when there is a coincidence of signals on all inputs. FIG. 19 shows the switch circuitry and the block representation therefor.

Figure 18:
FIG. 18 shows an electric configuration of diodes constituting a Mix circuit and the block representation therefor.

A mix has a plurality of inputs and a single ouput, the latter providing an output signal when a signal is present on any one of the inputs. The basic component in both the switch and the mix is the germanium diode which is well known in the art and is used primarily as a unidirectional current-carrying device. FIG. 18 shows the circuit arrangement and the block representation for a mix.

Diodes are also used for clamping and clipping in various places throughout the computer circuits.

A latch is comprised of a double inverter and a cathode follower and usually employs a diode switch or mix input to the latch. An input signal applied to the grid of the first triode causes the latter to conduct. This, in turn, lowers the grid potential of the second inverter below its cutoff point. In consequence, the plate voltage of the second inverter in the nonconducting state causes the grid of the cathode follower to rise to a conducting potential. As a result, the cathode follower output rises to about +10 volts potential. This output is available for use on other circuitry and it is also fed back to the grid of the first inverter through the switch and mix diode circuitry associated with the latch to maintain the latch in its ON position. This ON position will sustain itself until some external action is applied to the circuit to render the output cathode follower non-conductive. The latch may be turned OFF in a variety of ways. One way is to lower the signal on the latch back diode switch. Another way is to apply a positive signal to the second grid of the second inverter. Yet another way is to clamp the plate of the second inverter down with another triode. The latch may be turned ON also by applying a negative signal to the second grid of the second inverter.

A double latch is used where a positive output signal is desired in addition to the features of the signal latch. The double latch is comprised of two single inverters, two cathode followers and appropriate switch-mix diode circuitry for maintaining both latch outputs in rigid conditions.

A latch ring is comprised of a plurality of intercoupled stages of latches. It is used primarily to provide the basic timing gates within the computer.

All machine timings are related to the angular position of the drum. FIG. 5 shows the various timing intervals and how they relate to the drum. The drum is divided into five sectors, each of which is divided into 10-word intervals. Each word is divided into 12 equal-digit intervals, 10 digits, one sign position, and a space interval called digit X (DX).

The basic timing interval is an 8-microsecond digit interval, of which there are 600 around the circumference of the drum. Each digit interval is divided into four equal pulse intervals A, B, C and D. The beginning of a digit timing interval is marked by the leading edge of its A pulse. The B, C and D pulses of a digit follow at 2-microsecond intervals. Twelve digit intervals, each with its A, B, C and D pulses, make up one word. The 12 digits of each word are successively DX, D0, D1, D2, D3, D4, D5, D6, D7, D8, D9 and D10. DX is a space between successive words and is used as a switching interval. D0 is the sign storage time and D1 through D10 represent the serial time space intervals for storage of a 10-digit number. Ten word intervals are included in each sector and five sectors comprise the entire cycle of drum timing.

All drum times are with relation to Home position, which is the beginning of sector 0. The six timing tracks contain permanently recorded spots that are used to establish reference positions of the drum. These signals drive timing rings and pulse developing circuits that produce all of the timing pulses and gates used in the machine. The recorded signals are:

(1) Home pulse—one per drum revolution
(2) Sector pulse—five per drum revolution
(3) Word pulse—50 per drum revolution
(4) Digit pulse—600 per drum revolution
(5) A pulses
(6) B pulses
(7) C pulses
(8) D pulses The pulses listed above under item numbers 1, 2, 3, 6 and 8 are the basic ones of the machine, each is obtained by reading permanently recorded magnetic spots from appropriate timing tracks on the drum by an associated one of a plurality of cooperating read heads, one for each track. The output from each read head is applied to appropriate signal amplifying and shaping means, well known in the art, adapted to issue the signals listed above with the required amplitudes and time durations. The remaining pulses and other gate signals used throughout the machine are obtained from multivibrator or latch circuits activated by these pulses and/or other generated pulses or gate signals.

*Instruction Execution*

Figure 7:
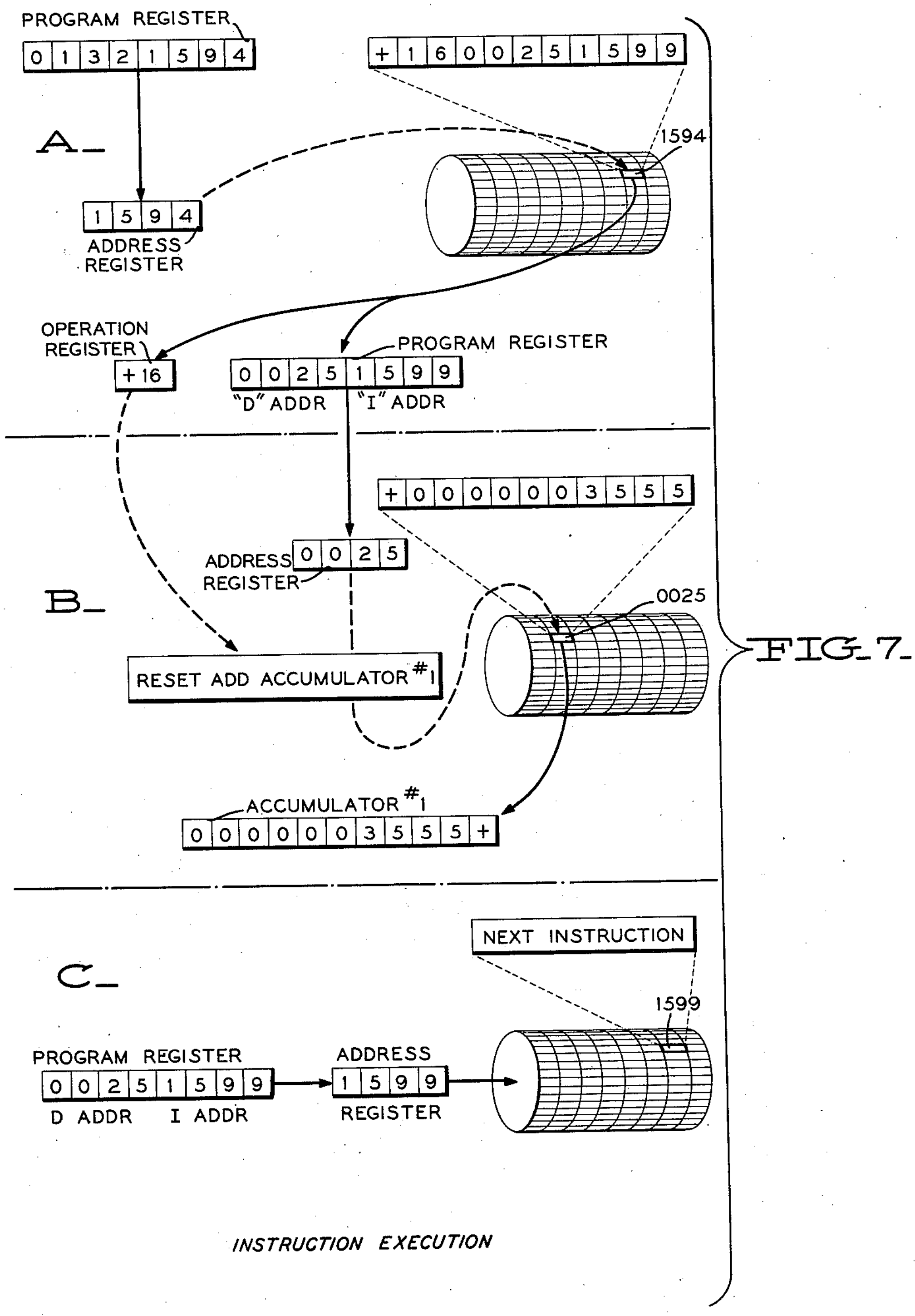
FIG. 7 shows in diagrammatic form the manner in which an instruction is executed.
Figure 8:
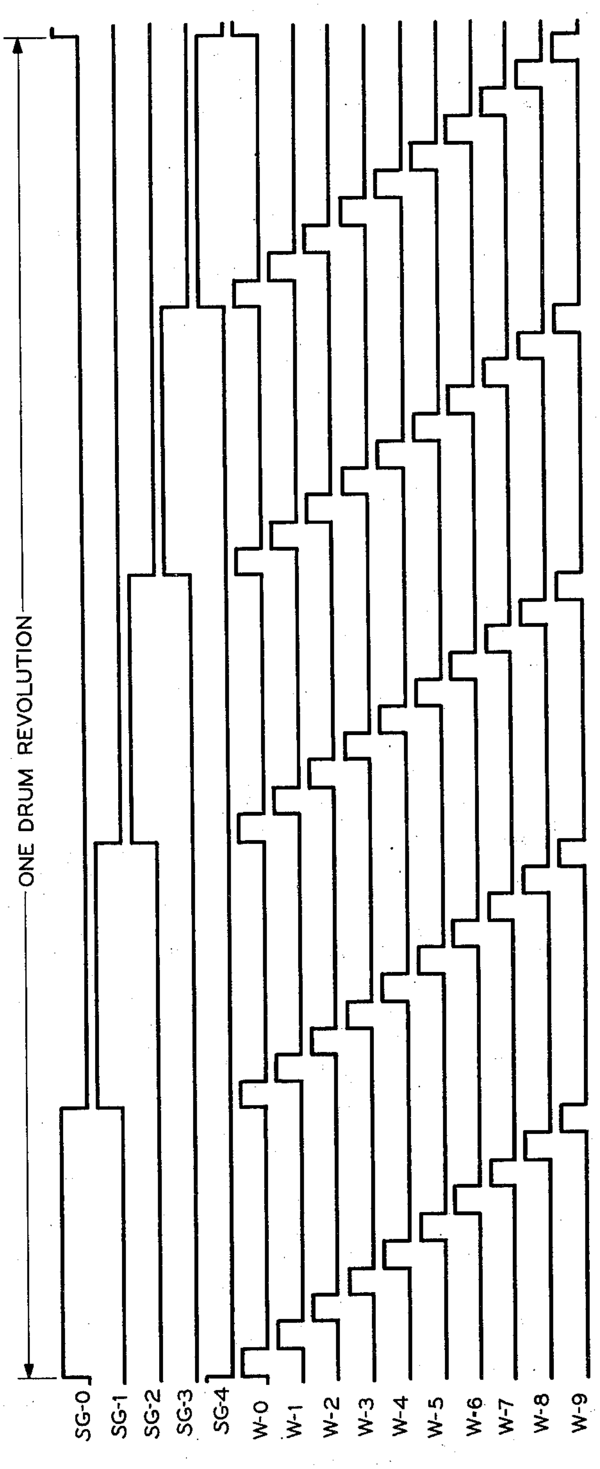
FIG. 8 is a time chart showing the relationship of the sector gates and the word gates in one drum revolution.

A somewhat rather schematic illustration is shown in FIG. 7 of the manner of how a typical instruction is executed by the computer. Here there is shown schematically a program register, an address register, operation register and an accumulator No. 1. In the program register shown at the upper left-hand corner, there is contained therein the D and I portions, respectively, of an instruction; namely, 0132 and 1594. The operation register shows that it contains a plus 16 code, which code provides for resetting and adding into accumulator 1 the contents specified by the D portion; namely, 0132, of the instruction.

The operations necessary to carry this instruction out begins with finding the location specified by the I portion of the instruction; namely, 1594, which instruction is passed into the address register; and, in accordance with the analysis made, the location 1594 is found on the drum. From this location, the instruction plus 1600251599 is found and fed to the operation register and the program register. This instruction calls for resetting accumulator 1 and then entering into it the contents of the location specified by the D portion (0025) of the instruction. The code +16 in the operation register causes accumulator 1 to be reset to zero; and thereafter, when the contents of a location 0025 is found, the latter will be transmitted therefrom to the accumulator 1. At the end of this entry operation, the accumulator will have standing therein the amount 00000035555+. After this portion of the instruction is completed, the I portion 1599 is fed from program register into the address register, as shown at the bottom of FIG. 7. This portion of the instruction is located, then analyzed, and, as a result of the analysis, the contents of the next instruction is selected, and processed in the manner described.

*Program Controls*

The program controls in the computer allow the latter to automatically progress from one instruction to another. The instruction may be located in any addressable location and placed in the Operation-Program Registers for analysis. The time involved in obtaining the instruction is known as the instruction half-cycle or I half-cycle. The performance of the specified operation takes place during the data half-cycle (D half-cycle). A complete instruction cycle on the computer then consists of: (1) locating the instruction and placing it into the Operation and Program Register, and (2) interpreting the code and performing the specified instruction. The controls may be thought of as cyclic in nature, alternating between I and D half-cycles, as may be appreciated from FIG. 22.

For continuous operation, a Restart to I signal denotes that the previous operation is being performed and that the old instruction is no longer required in the Program Register. The Restart to I signal actually occurs during the D half-cycle. The controls are interlocked in this half-cycle by the D control signal. In order to perform the I half-cycle, the D control signal is turned off and I control is turned on. With the machine in the I half-cycle, a waiting period is required to allow the drum to revolve to the location addressed. The waiting or search time varies from one to fifty word times and is interlocked by the STG RI—RO signal. This signal is turned on just prior to the word to be read out and sets up the circuitry for reading the instruction into the operation and program registers.

Figure 4A:
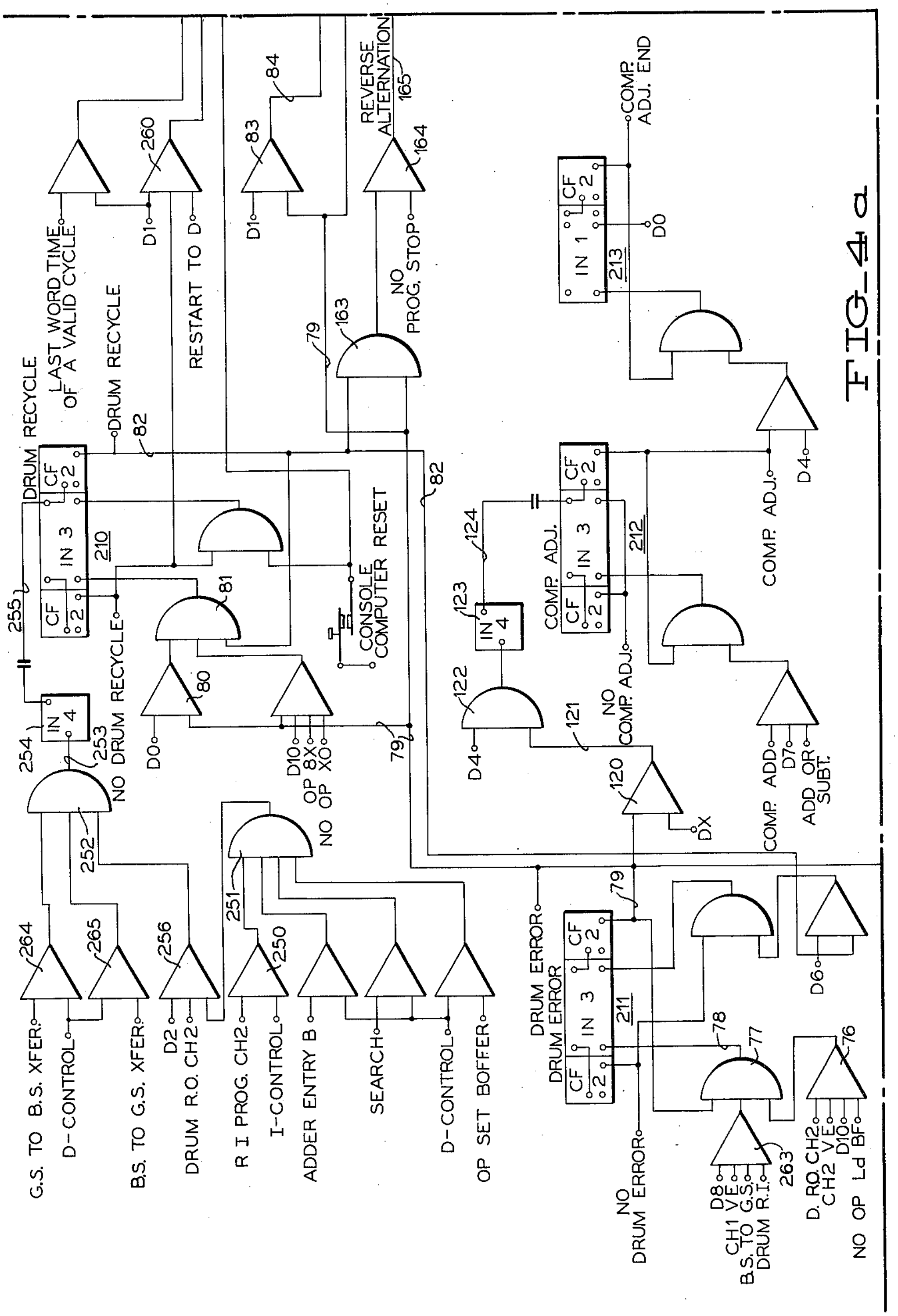
FIGS. 4*a* through 4*f* are arranged to form a logical circuit diagram constituting the main features of the invention.
Figure 4B:
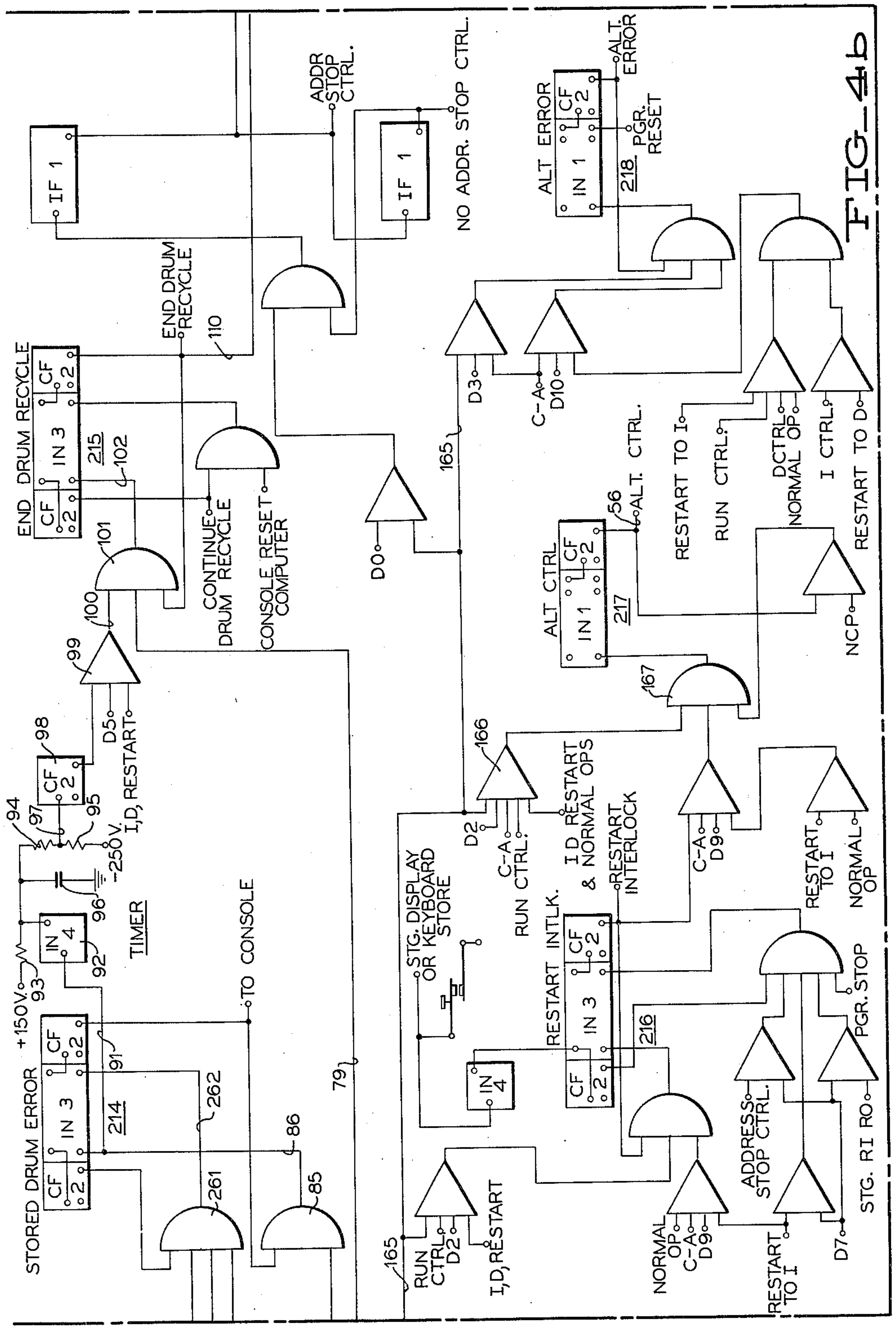
Figure 4C:
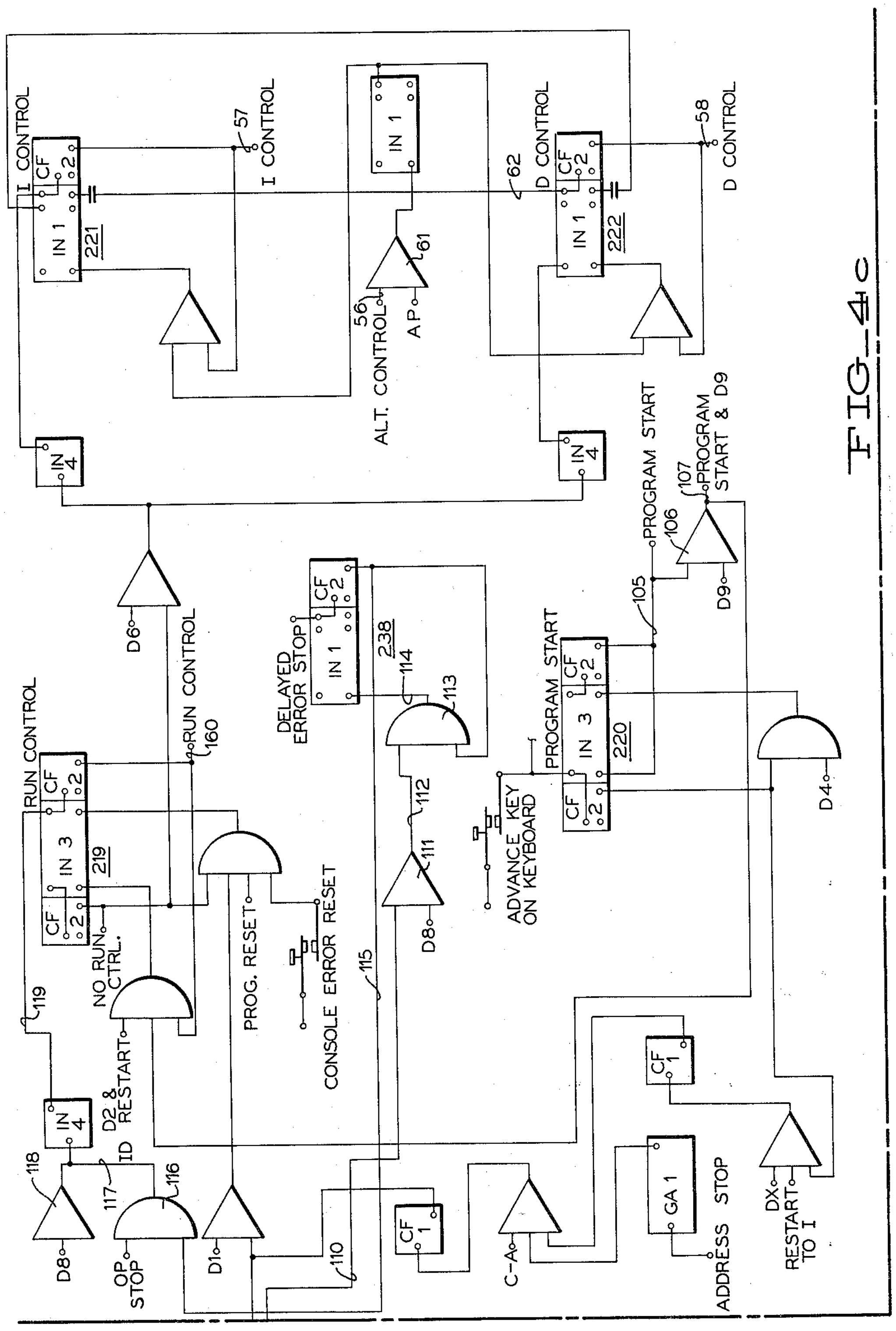
Figure 4D:
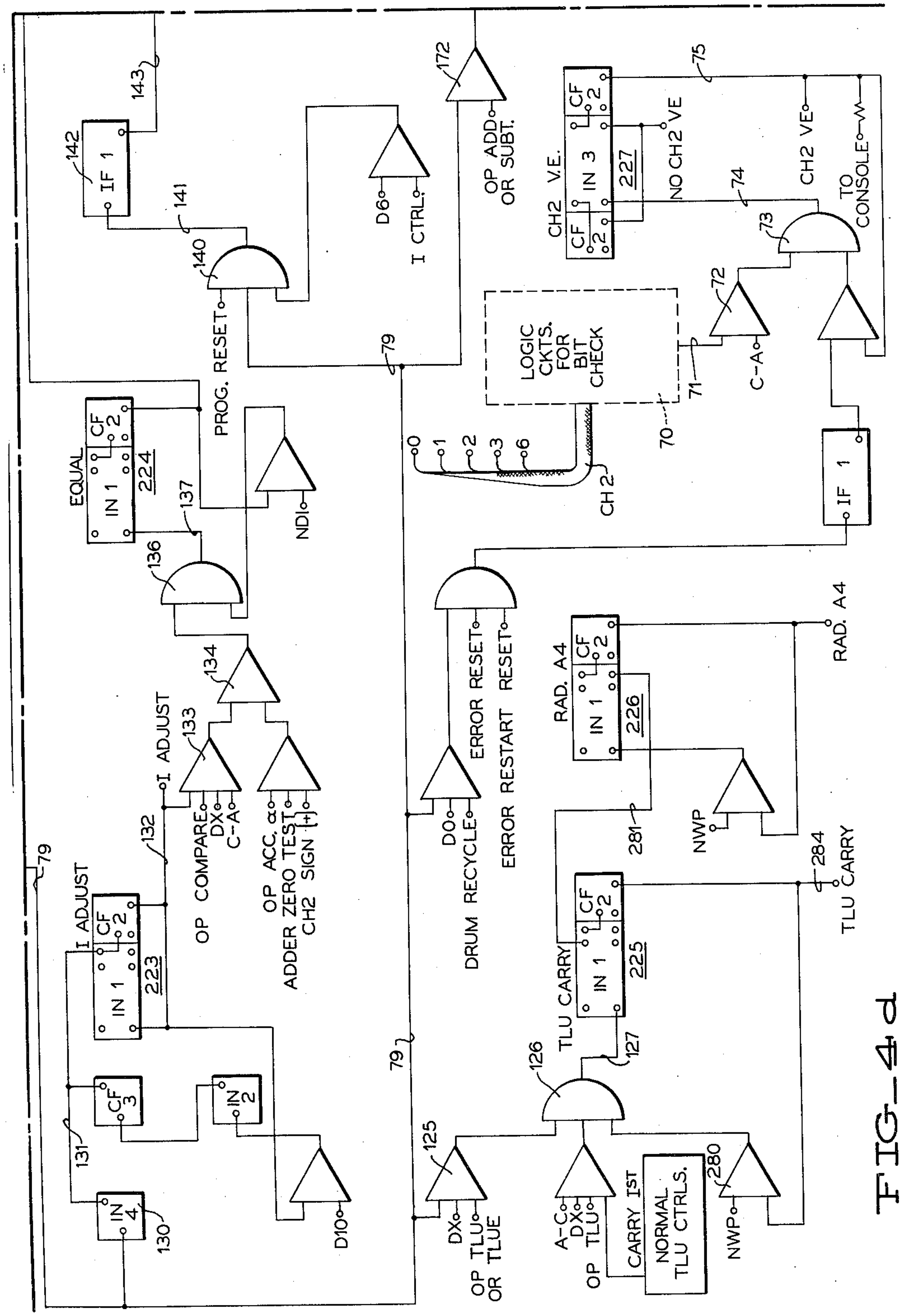
Figure 4E:
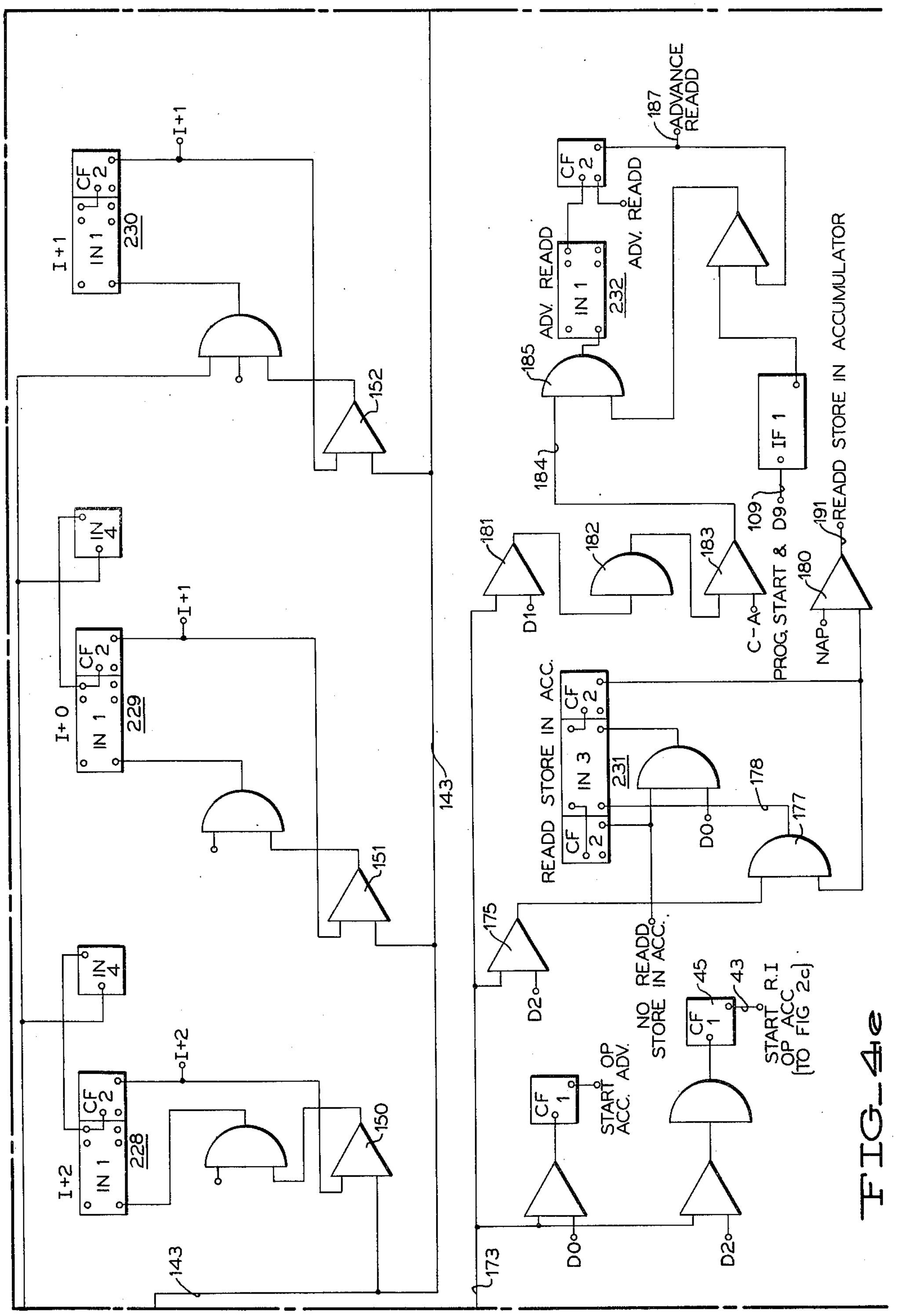
Figure 4F:
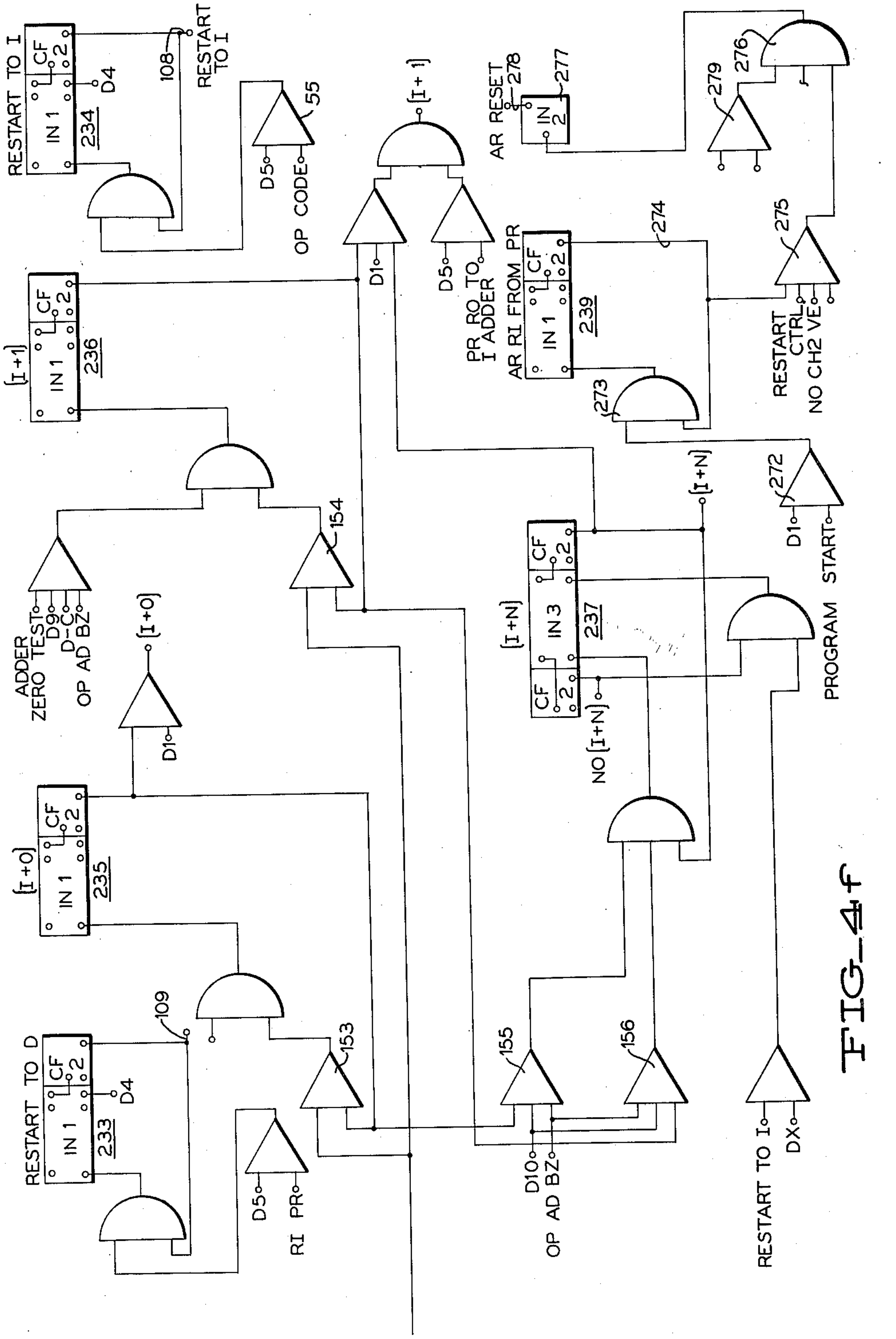

The Restart to D signal is developed during the instruction read-in cycle under control of the latch 233, shown in FIG. 4*f*, whose on output is passed along line 109 to cause an alternation change from I control to D control. With the new instruction in the Program Register and D control effective, the operation may be interpreted and performed. A Restart to I begins the cycle for a new instruction.

Figure 22:
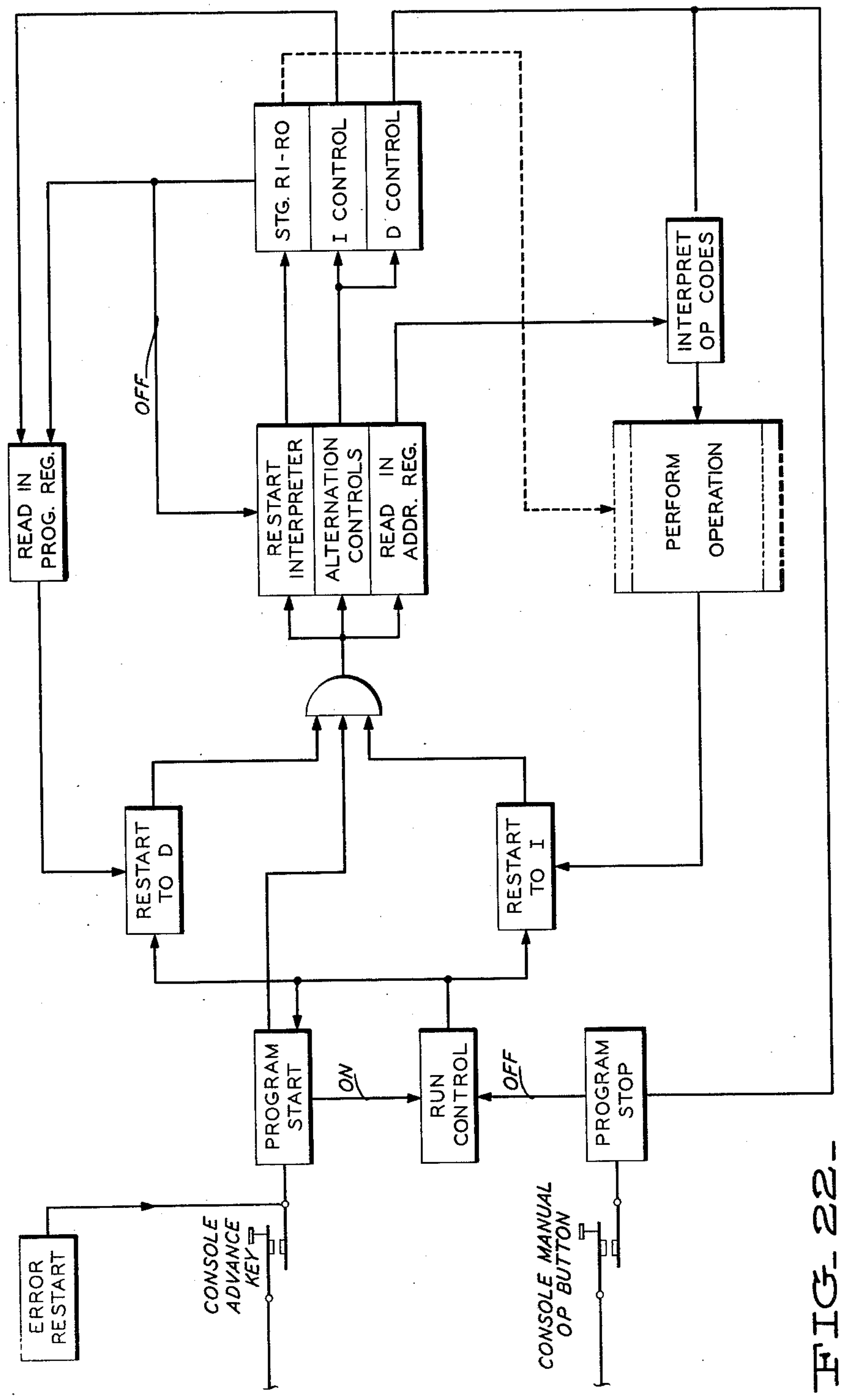
FIG. 22 is a schematic diagram of program control operations.

The machine must be in run status; i.e., the Run CTRL latch 219, in FIG. 4*c*, must be on, to be able to alternate between I and D control. The output of the latch 219 is passed on an output line 160. The program control circuits are prevented from advancing by turning off Run Control. This can only occur during the D half-cycle and prevents the Restart to I signal from occurring so that the D half-cycle may begin with the following word time. On an I half-cycle, the following conditions must be effected or set up:

(1) Restart to I
(2) Change alternation (from D control to I control)
(3) Reset and Read-in Instruction Address to Address Register
(4) Search for instruction (STG RI—RO)
(5) Read-in Operation Register and Program Register
(6) Restart to D The following portion of a program together with FIG. 22 are utilized as a means for explaining the above operations:

XX–XXXX–0017
+17–0033–XXXX

The instruction—Add to Accl (+17)—is located in drum location 0017. When the Restart to I signal occurs, the address register contains the D address of the previous instruction. In order to condition the drum selection circuits, the new address (0017) must be transferred to the address register.

The Restart to I signal actually occurs during the D half-cycle. The machine is interlocked in this half-cycle by the D control signal. In order to perform the I half-cycle, D control is turned off and I control is turned on. With the machine in the I half-cycle, a waiting period is required for the drum to revolve the exact location that is addressed. The waiting or search time varies from one to fifty words, depending on optimum programming. The STG RI—RO signal is turned on just prior to the word to be read out (0017) and sets up the circuitry for reading the instruction into the OP and Prog Reg.

The Restart to D is developed during this I to PR cycle to cause an alternation change from I control to D control.

On a D half-cycle, the following conditions must be effected or set up:

(1) Restart to D
(2) Change alternation (from I control to D control)
(3) Reset and read in address register
(4) Interpret OP Code
(5) Search for Data (STG RI—RO)
(6) Perform operation
(7) Restart to I FIG. 22 shows the above objectives in simple block diagram form.

The machine must be in run status to be able to alternate between I and D control. The program control circuits are prevented from advancing by turning off Run Control. This can occur only during the D half-cycle and prevents a Restart to I from occurring. The Advance Key on the control console is used to start the program running. The program start signal initiates an alternation change (D to I) and turns on run control to prepare for continuous operation. With the machine in manual status, the Advance Key functions as a single cycle start key.

The circuit operations during I half-cycle will now be considered.

(1) Restart to I. The Restart to I latch 234, shown in FIG. 4*f*, is turned on, via switch 55, by switching a D5 gate with a specific gate developed during the preceding operation. The latch is kept on for only one word time and sets up the circuitry to change alternation from D control to I control. The on output of the latch is passed along output line 108.

(2) Change Alternation. The Restart to I latch output is switched with a Normal OP (not on manual) and Run Control to develop the Restart Control signal. It may be pointed out that Run Control latch 219 in FIG. 4*c* was turned on with a Program Start signal and remains on until a Program Stop is initiated. The Restart interlock latch 216 in FIG. 4*b* is turned on at D9 time and its output turns on the Alternation Control latch 217. The Alternation Control latch output is passed along a line 56 and is switched with an A pulse by means of a switch 61, shown in FIG. 4*c*, to open the latch back of the D control latch 222. As the D control latch turns off, its capacity coupled plate output turns on the I Control latch 221 by way of line 62. The on outputs from the D CTRL latch 221 and the I CTRL latch 222 are passed along output lines 57 and 58, respectively, and are further shown in the sequence chart of FIG. 23.

(3) Reset and Read-in Address Register. With the machine in the I half-cycle, the address in the Address Register 6, FIG. 2*f*, must be changed. An AR Reset signal is developed at D10 (C—A) time with Restart Control and no validity error on Channel 2. This signal opens the latch back on all the address register latches. The I to AR latch is turned on to gate the I address into the address register. The I to AR output is a $D10_c$–$DX_c$ gate and overlaps the AR Reset signal.

The ARRI from PR latch is turned on with each Program Start signal and its output is used to develop the AR Reset signal. It is turned off only by a Program Reset signal. Its function, therefore, is to prevent a stray AR Reset from occurring between a program Reset and the following Program Start signal.

(4) Search for Instruction. Because the instruction may be located on the drum, in an accumulator or in the cores, some means of timing and selection are necessary. The STG RI—RO latch 205, FIG. 2*f*, provides this timing condition. For a drum address it is necessary to wait for one word early gate to locate the exact drum location. With an accumulator address, the STG RI—RO latch 205 is turned on immediately. The No Accum Interlock signal at this switch signifies that the accumulator being addressed is still not being used from the previous operation. The STG RI—RO latch stays on until the next ND8 and sets up the circuits for reading into the Program Register.

(5) Read-in Operation Register 5 and Program Register 4. Using the same example where the instruction is located in 0017, other objectives for this operation are as follows:

(*a*) Allow the drum to read out onto Channel 2.
(*b*) Inhibit the normal zeros on Channel 2.
(*c*) Advance the Prog Reg (readout).
(*d*) Block regeneration of the Prog Reg.
(*e*) Read in Prog Reg (D1 through D8).
(*f*) Read in OP Reg (D0, D9 and D10).
(*g*) Zero Insert Index Adder Entry A.

The drum address in the address register conditions the drum read circuits. The information is gated onto Channel 2 under control of Drum RO latch 204. The selection circuits control the turn on of STG RI—RO latch whose latch output is switched with I control to turn on Drum RO latch. The Drum RO latch is on for only one word time (D0 through D10) and, therefore, gates out the particular location addressed.

A PR Advance Control latch is turned on at D0 (C—A) time. Its output is switched with an AP to cause the Program Register to advance and turn on the PR Regeneration latch. It remains on through D9 (C—A) (nine advance pulses) since the input to the Program Register is delayed one digit when the input comes from the Index Adder.

A RIPR from Channel 2 latch output signal on switch 7, FIG. 2*e*, is switched with ND9 and ND10 to allow Channel 2 information to enter Index Adder Entry B for eight digit times—D1 through D8. To read into the Operation Register, the RIPR from Channel 2 latch output is sampled at D9 and D10 time (STG RI—RO). D0 gate is used to reset the Operation Register latches. The instruction sign is read into the Operation Register sign latches by switching Channel 2 with (I control, STG RI—RO) D0 gate.

The normal zeros on Channel 2 are inhibited at D0 time by the Channel 2 Sign Entry Control gate and at (D1–DX) time by the RIPR from Channel 2 gate. The zeros are normally present to satisfy the validity check circuits.

(6) Restart to D. With the controls set up and during the time the instruction is being read into the Program Register, the Restart to D signal is developed at D5 time. The Restart to D latch is used to initiate a D half-cycle so the operation specified by the new instruction may be performed.

*Re-Add Operations*

In addition to the six accumulators described, there is still another accumulator called a Re-Add register 240, shown in FIG. 2*b*, of the shift register type, having a capacity of ten digits and sign. Input to this register, as seen in the flow diagram, may be switched from either Channel 1 or Channel 2, or from the console keyboard. The output from this register may be switched to Channel 1 or to any one of the six accumulators. The Re-Add register may be used during a manual display operation, or a dividing operation. During the former, data is read into the Re-Add register from whence it is extracted at an appropriate time and passed onto display tubes of the console in the manner described in a copending application filed July 1, 1957, Serial No. 669,321, to George J. Saxenmeyer.

During a divide operation, the Re-Add register is used for storing the partial dividend.

A significant feature of the Re-Add register is in its use; in the event of an error during an arithmetic operation, in preserving and re-using the original contents of an accumulator involved in the arithmetic operation, for a period of successive arithmetic cycles until the arithmetic operation is executed without error. This will be more fully described hereinafter under Recycling Operations.

Before describing the logic operations pertaining to recycling, a brief description will first be given of the various means concerned with an arithmetic operation in order to provide a basis for the description of the recycling operation. In adding two factors; for example, A and B, the following units and operations are involved. The factor B is generally located on the Drum 1 by an appropirate instruction and read out onto Channel 2 and then through Adder Entry B switch 22, a mix circuit 23, a Decimal Translator 24 to the B entry of the Main Adder 2. Simultaneously, the A factor is extracted from accumulator, ACC No. 1, 241 in FIG. 2*b*, and passed through an "A1RO to Channel 1" switch 25, line 26, a mix 27, Channel 1, True or Complement Decimal Translator 28 in FIG. 2*c* to the A entry of the Main Adder 2. The entry into the Main Adder is effected by way of the entries A and B, a pair of digits at a time. The output 2*a* of the Main Adder provides signals which represent the sum of each pair of digits so entered. This output is passed into the adder output line 2*a* through the mix 14, output lines 14*a* and 15, A1RI switch 29 to the ACC No. 1, 241.

The Decimal Translator 24 is essentially a logic circuit comprised of diode switches and mixes having five input lines and ten decimal output lines 0–9. For each group of coded input signals, coded according to the scheme shown in FIG. 6, applied to the input lines, the Translator issues a signal on an appropriate one of the ten decimal output lines. These ten decimal output lines in turn are connected to the Main Adder 2.

The True or Complement Decimal Translator 28 is also a logic circuit comprised of switches and mixes having five coded data input lines over which two-out-of-five coded signals are transmitted, and ten decimal output lines connected to the Main Adder. In addition, the Translator 28 is provided with two input controls; namely, True Add and Comp. Add, Comp. standing for Complement. When the True Add line is effective, the two-out-of-five coded signals applied cause the Translator to issue a signal on appropriate one of the ten decimal output lines. However, if the Comp. Add line is effective instead of the True Add line, a signal would then be issued on the decimal output line whose value represents the 9's complement of the decimal value initially issued.

The switches mentioned above, as well as others, are provided with appropriate gate signals under control of the following latches; namely, storage read-in/readout (STG RI—RO) 205 seen in FIG. 2*f*, Drum RO 204, accumulator 1 readout to Channel 1 (A1RO to CH #1) 200 in FIG. 2*b*, accumulator read-in from adder (A1RI fr Adder) 202 in FIG. 2*c*, OPA1 203, in connection with Re-Add operations to be later explained in detail, the Re-Add read-in from Channel 1 latch latch (Re-Add RI fr CH #1) 201 in FIG. 2*c* is turned on.

The STG RI—RO latch 205, in FIG. 2*f*, is turned on when there is coincidence in the signals to the three inputs of switch 31. These signals are one word early, digit 9 and a Drum Location signal issued by the address selection means 12 under control of an appropriate instruction. The output of the switch 31 passes through a mix 32 to turn on the STG RI—RO latch 205. A digit 8 is used to turn the latch off. When the latch is on, the STG RI—RO signal is applied on line 33, which signal is utilized by various switches and units throughout the computer.

The Drum RO latch 204, also shown in FIG. 2*f*, is turned on when there is coincidence of signals; namely, STG RI—RO and an OP Add or Subt signal applied to respective inputs of a switch 34. The output of the latter is fed through a mix 35, output line 36, to the latch 204, the on output of which is fed on line 37. The output of the switch 34 is applied to a line 38 termed Add Subt.

The A1RO to CH #1 latch 200 in FIG. 2*b* is turned on when there is coincidence in the signals; namely, digit 1 and A1RO (accumulator 1 readout) applied to a switch 39 whose output, when on, turns on the latch. The A1RO signal is effective under control of the Operation Matrix 11 when an appropriate instruction is fed to the computer. The latch 200 is turned off by a digit X signal.

When an appropriate instruction is fed to the computer, the Operation Matrix 11 issues an OPA1 signal on a line 41, which is employed to turn on the OPA1 latch 203 seen in FIG. 2*c*. The on output from the latch is applied to a line 42 to an input of a switch 44 having a second input 43 connected to the output of a cathode follower 45 shown in the logic circuitry of FIG. 4*e*. The signal issued by cathode follower 43 is termed Start RI OP ACC and, when coincidence is achieved by this signal, together with the OPA1 signal, issued on line 42, the switch, in FIG. 2*c*, is effective to supply an output through a mix 47 to turn on the A1RI fr Adder latch 202. This latch is turned off by a digit zero signal. The on output of the latch 202 is applied to the line 48 which feeds the switch 29 in FIG. 2*b*.

The Re-Add RI fr CH #1 latch 201, in FIG. 2*c*, is turned on under control of a signal issued by a switch 51 upon coincidence of signals applied to its inputs. These signals are a digit 1 and OP Add or Subt signal, passing over a line 52, developed by the Operation Matrix 11 under control of an appropriate instruction.

During the normal course of the computer program, while an arithmetic operation is being executed, other circuits are being utilized and controlled by appropriate latches. For example, during a subtraction operation, it may be necessary for a recomplement operation to be performed before the next succeeding add or subtract operation may be initiated. For this purpose, an appropriate complement adjust (Comp Adj) latch 212 is used. This latch is found in the logic circuitry of FIG. 4*a*. Related to this complementing operation is another latch called complement adjusted end (Comp Adj End) latch 213, also shown in FIG. 4*a*.

In table lookup operations, appropriate latches are shown in the logic circuitry of FIG. 4*d*. These are appropriately called table lookup carry (TLU) latch 225, reset and add the data address into accumulator A4 (RAD A4) latch 226.

Other latches; namely, instruction adjust (I—Adjust) 223, Equal latch 224, are employed when instructions are being modified in the computer. In addition to these latches, other instruction modification latches are shown in FIG. 4*e*. These are appropriately labeled as I+2 latch 228, I+0 latch 229, I+1 latch 230.

In FIG. 4*b*, latches 216, 217 and 218 are used, respectively, for such operations as interlock control, alternation control and alternation error control.

In FIG. 4*c* are latches employed respectively for program control, latch 220; instruction control by means of the I portion of an instruction, latch 221; and also by means of the D portion of an instruction, latch 222. A Run Control 219 is also shown in this logic circuitry.

In FIG. 4*f*, latches 233 and 234, respectively, entitled Restart to D and Restart to I are used to set the computer to either a D half-cycle or an I half-cycle depending upon the conditions required in the computer. Also in FIG. 4*f*, there are appropriate latches (I+0) latch 235, (I+1) latch 236 and (I+N) latch 237, employed when modification is being controlled by means including the Index Adder 2.

*Recycling Operation*

The recycling operation will now be described in connection with an adding (or subtracting) operation during which the Re-Add register is used. In brief, the operation includes the following steps:

(1) Detecting a validity check error on Channel 2 during the issuance of data from the drum and turning on a drum error latch 211 in response to the detected error.

(2) Remembering the error by appropriate means, including a latch, and turning on a drum recycle latch 210.

(3) Resetting the various logic circuitry normally associated with a valid arithmetic operation, such logic including latches associated with complement adjust, as well as others to be described. This resetting operation is under control of the drum error latch and other error control circuits.

(4) Initiate operations of the recycle timer.

(5) Correcting the active accumulator on the first word time following the cycle in which the error occurred. This correcting operation involves reading out the contents of the Re-Add register into the accumulator involved in the arithmetic operation.

(6) Reverse alternation; i.e., switch the computer from an I cycle to a D cycle.

(7) Perform the same arithmetic operation as that performed during the previous drum revolution in which the error occurred. This operation includes setting up circuitry relating to the one word early operation, storage read-in/readout, reading out of drum data and reading out of accumulator data.

(8) Stop the computer if the error is not cleared up during a prescribed time interval by turning off the run latch; also displaying the error by appropriate indicating means on the console, and providing the active accumulator with the contents of the Re-Add register.

The above steps of operation will now be described with the aid of the sequence charts of FIGS. 23*a* and 23*b*; the logic diagrams, FIGS. 4*a* through 4*f*; and the flow diagram of FIGS. 2*a* through 2*f*. The recycling operation is assumed to begin with an adding operation, which operation is appropriately represented as being effected in the third word time of the sequence chart. The add operation, as earlier mentioned, entails the addition of two factors; namely, A and B, the former being stored by a previous operation in the accumulator 1 of FIG. 2*b*. Factor B is extracted from some drum storage location, determined according to a specific instruction of the computer. Both factors A and B are read out from their respective locations at precise digit time intervals of the word onto Channels 1 and 2. Factor B is read onto Channel 2 as factor A is applied to Channel 1. From Channel 1, the A factor enters the Main Adder 2. Also, at the same time, factor A is read into the Re-Add register 240, seen in FIG. 2*b*. During the word time that this operation is being effected, the B factor is also entering the Main Adder 2; and, as a result, the latter provides an output representing the sum of the factors A and B, this being done on a serial basis, digit by digit. The A factor output from accumulator 1 is read out under control of the switch 25 gated by the output, along line 65, of the A1 to CH #1 latch 200. This output, of course, passes through the Mix 27 onto Channel 1 and eventually to the Main Adder 2, as explained. At the same time, the A factor is gated with the output of the latch 201, FIG. 2*c*, which output passes along line 67 through switch 66 and into the Re-Add register. While this adding operation is underway, a validity check error develops; for example, at digit 9 time, on Channel 2 through which the B factor is being transmitted. This portion of Channel 2 is shown in FIG. 4*d* where it is seen entering a box 70 containing logic circuitry, not shown, which provides an error signal whenever more or less than two bits are present on the five lines constituting Channel 2. The validity check error output passes along line 71 which is gated with a C—A signal in a switch 72 to provide an output switch signal which passes through a Mix 73 through a line 74 to turn on the CH #2 VE latch 227. The on output of this latch is applied to a line 75. This signal passes into a switch, seen in FIG. 4*a*, where it is gated with a drum readout on Channel 2 signal, a NO OP-Load-Buffer signal and a digit 10 signal to effect an output from the switch 76. This output passes through a Mix 77, a line 78 to turn on the Drum Error latch 211, the on output of which is fed along line 79. At digit zero time of the next word interval, the Drum Recycle latch 210 is turned on by means of a switch 80 when coincidence is achieved on its inputs between a digit zero signal and the drum error signal on the line 79. This output of switch 80 passes through a Mix 81 to the latch 210. The on signal of the Drum Recycle latch 210 is passed along output line 82.

The Stored Drum Error latch 214 is provided to remember the error. This latch is turned on at digit one time of the word interval following the word in which the error occurred. Turning on of the latch 214 is effected by way of switch 83, line 84, Mix 85 and line 86, the latter being effective when coincidence is achieved in the signals on the inputs to the switch 83.

When the latch 214 is turned on, the off side thereof provides a down level shift on the off output line 91. This down level signal is transmitted to a Timer comprised of an inverter 92 whose output is passed into an RC integrating network which includes resistors 93, 94 and 95 and a capacitor 96. The unique part of this arrangement is that the inverter, when rendered conductive, provides an extremely fast discharge path for the capacitor. The output of the delay network is passed over line 97, the cathode follower 98 to one of three inputs to switch 99, the other two inputs being fed by a digit 5 signal and an I, D Restart signal. When coincidence is achieved in the signals to these outputs, the switch 99 issues a signal on line 100 and passes through a Mix 101 to a line 102 which turns on the End Drum Recycle latch 215. The inverter 92 has an input resistor value of 4.7K ohms; resistors 93, 94 and 95 have values of 100K ohms, 390K ohms, and one megohm, respectively. The capacitor 96 has a capacitance of one microfarad. In effect, the purpose of the timer is to provide a sufficient time interval for the error to clear up or disappear if such error be of the elusive type that occurs rather infrequently. If the error does not clear up within this interval of time, appropriate means will be set up to cause the computer to stop and to provide an appropriate display on the console.

The stopping of the computer is controlled, of course, by means of the output signal from the timer, which signal is employed to turn on the latch 215. The on output from this latch 215 is applied on output line 110 to a switch, in FIG. 4*c*, which is gated by a digit 8 signal to provide an output on a line 112, through a Mix 113, line 114 to turn on a Delayed Error Stop latch 238. The on output of the latter is applied on output line 115 which passes through a Mix 116, mix output line 117, to an inverter 118, whose output, now down, is applied to line 119 to turn off the Run Control latch 219. The turning off of this latch causes the computer to stop. If the error had been cleared up before the termination of the timing interval, the latch 215 would not have been turned on and, as a result, the computer operations would have proceeded uninterruptedly.

According to the sequence chart of FIG. 23, it follows that certain operations which had been set up during the course of the error must be disabled. For example, during a subtraction operation, a recomplementing operation may be required. For this operation, a Comp ADJ latch 212, in FIG. 4*a*, is provided and is turned on, as well as an associated latch 213, when the need for complementing arises. The latch 212 will be turned off during the course of the error by way of a switch 120, in FIG. 4*a*, through which the Drum Error on output signal is gated with a digit X signal to provide an output signal on line 121, through a Mix 122, an inverter 123, line 124, capacitively coupled to the plate of the second inverter in the latch 212.

Next to be considered in the recycling operation is the readout of factor A from the Re-Add register to accumulator 1. According to the sequence chart, this operation is executed in the word time following the word time in which the error occurred. As a preliminary to this operation, the computer must be switched out of the I half-cycle which is in progress to a D half-cycle. This switching is effected under control of a Reverse Alternation control signal developed by switch 164, in FIG. 4*a*, fed by a NO PGR Stop signal and the output of a Mix 163, which, in turn, is fed by a Drum Recycle signal applied to the line 82 and a drum error signal fed by way of line 79. In FIG. 4*b*, the reverse alternation signal on the line 165 is fed into a switch 166 where it is gated with an I, D Restart signal, a Run CTRL signal, a C—A gate, and a digit 2 gate. When all of these signals are present, the switch 166 is effective to pass an output through a Mix 167, to the ALT CTRL latch 217 to turn the latter on. The output from this latch passes over output line 56 called ALT CTRL. The on output signal on this line is gated with an AP in the switch 61, seen in FIG. 4*c*, to turn the D CTRL latch 222 on and the I CTRL latch off. With the computer in the D half-cycle, the operation of extracting the A factor from the Re-Add register and entering the same into accumulator 1 may now be initiated. For this operation, the Re-Add Store In ACC latch 231, seen in FIG. 4*e*, must be turned on to provide an appropriate gate signal to a switch 170, shown in FIG. 2*b*, to enable the Re-Add output (i.e., the factor A) to pass to accumulator 1 by way of line 171, the Mix 14, seen in FIG. 2*c*, lines 14*a* and 15 through the switch 29 to accumulator 1. The means for turning the latch 231, seen in FIG. 4*e*, includes a switch 172, seen in FIG. 4*d*, switch output line 173, a switch 174, a line 175, a Mix 177, line 178 to the latch 231. The switch 172 is effective to supply an output whenever coincidence is achieved in the signals applied to the inputs to the switch 172. These signals are Drum Error and OP Add or Subt. The output signal is then gated with a digit 2 signal in the switch 175 which, in turn, provides an output that turns on the latch 231. The on output of the latch is gated with a NAP in a switch 180 whose output, when applied to line 191, provides the gate signal to the switch 170 controlling the output of the Re-Add register in FIG. 2*b*.

At the completion of the word time in question, accumulator 1 will have contained therein the A factor; the Re-Add register will have a zero setting and be in readiness to again accept the factor A when the add operation is repeated one drum revolution later.

The second add operation, indicated as recycle add operation in the sequence chart, will be effected by the computer in the same manner as the previous add operation. The recycling will be repeated for as many drum revolutions as will be permitted within the interval provided by the timer. Should the error clear up within the interval provided, computer operations will continue according to routine determined by the program employed. Should the error persist, the computer will be stopped with the contents of the Re-Add register being read into accumulator 1. In FIG. 4*e*, there is found an advance latch 232 labeled ADV Re-Add, which latch is turned on under control of switch 181, Mix 182, switch 183, line 184, Mix 185. The signal issued from the circuit is the drum error signal gated at C—A time of digit 1. The on output of the latch 232 is fed out on an output line 187 to control the advancement of the Re-Add register which, as mentioned earlier, is of the shifting register type, that requires an advancing pulse for its operation.

The recycling feature is also employed to recycle instruction data from a storage location into the program register in the event a validity check error occurs on Channel 2. This operation is concerned with the following steps:

(1) Reading the instruction from storage by way of Channel 2 to the program register.

(2) Detecting the error on Channel 2 and providing appropriate signals.

(3) Retaining the address location of the instruction in the address register by inhibiting the normal reset signal to the address register.

(4) Maintaining computer operations in the I mode; i.e., I half-cycle, until a successful storage readout is obtained.

(5) Stop computer if error does not clear up within the interval provided by the timer.

The instruction from the drum 1 is passed on to the program register 4 by way of switch 270, in FIG. 2*a*, through Channel 2, switch 7, in FIG. 2*e*, Mix 8, a decimal translator 9 through the index adder 3, line 3*a* through the Mix 10 and into program register 4.

When the validity error occurs on Channel 2, the latch 227, FIG. 4*d*, is turned on in the manner previously explained and provides an appropriate error signal on the line 75.

Next in the sequence of operation, the Drum Error latch 211, in FIG. 4*a*, is turned on. The Drum Error latch on output passes over line 79 to turn to the Drum Recycle latch 210 in the manner previously explained. The Stored Drum Error latch 214, FIG. 4*b*, is also turned on by gating the Drum Error signal on line 79 with a digit 1 gate through switch 83. The timer is set into operation under control of the Stored Drum Error latch 214, as previously explained.

The reverse alternation signal on the line 165, FIG. 4*b*, is developed in the manner previously explained to turn on the ALT CTRL latch 217. This latch then sets the computer to the I mode by setting on the I CTRL latch 221, in FIG. 4*c*, and turning off the D CTRL latch 222.

To retain the address location in the address register 6, in FIG. 2*f*, the AR Reset signal is inhibited during the time it normally is used to reset the address register. The circuitry for developing as well as inhibiting the address register reset signal is shown in FIG. 4*f*. This circuitry includes an ARRI fr PR latch 239 which is turned on under control of a switch 272, and a Mix 273. Inputs to the switch are digit 1 and program start. The on output of the latch is passed onto output line 274 to a switch 275 having three other inputs on which the following signals appear; namely, restart control, no Channel 2 validity error and no drum recycle or no drum error. When coincidence is achieved in these signals, the switch 275 provides an up level output through a Mix 276 to an inverter 277 which provides a down level address register reset signal on line 278, this being the normal reset signal which is applied to reset the address register in FIG. 2*f*; however, in the event of a validity check error on Channel 2, the switch 275 will be ineffective so that its output will be negative to render an up level signal on the line 278. In this manner, the reset signal is inhibited to prevent resetting of the address register.

According to the sequence chart of FIG. 23, the various latches dealing with recycling operations are turned off during each recycled operation. This is necessary in order to enable the various circuits to be tested for the same conditions that may arise in the event the error is repeated. Accordingly, the drum recycle latch in FIG. 4*a*, is turned off during an instruction recycling operation by means of an up level signal which passes through switch 250, Mix 251, switch 256, Mix 252, line 253, to inverter 254. From the latter, the down level signal is applied by way of a capacitor and through the line 255 to turn off the latch 210. The latch 214, in FIG. 4*b*, is turned off under control of switch 260 in FIG. 4*a*, whose output is up when the latch 210 is off. This up level output passes through Mix 261, in FIG. 4*b*, line 262, to turn off the latch 214.

For a more summarized showing of the principal feature of the invention, reference is also invited to the schematic showing of FIG. 24.

During the modification of an instruction, the I Adjust latch 223 in FIG. 4*d* would have been turned on during normal operations. In the case of an error, however, the latch will be turned off by way of a circuit which includes an inverter 130, line 131, connected to the plate of the second inverter in the latch 223. When this latch 223 is turned off, the on line 132, now down, will prevent the operation. The turning on of the Equal latch 224 is prevented in view of the absence by virtue of coincidence in the signals to the inputs of switch 133, whose output feeds a switch 134, the latter in turn feeding a Mix 136 whose output passes through a line 137 to the latch 224.

Also, during the course of an instruction modification in which the Main Adder is engaged, in, any one of three latches; namely, I+2 latch 228, I+0 latch 229, I+1 latch 230, all shown in FIG. 4*e*, may have been turned on during the operation. In the event of an error, a reset circuit becomes effective to reset these latches: This reset circuit includes the drum error output line 79, which now carries the error signal through a Mix 140, seen in FIG. 4*d*, line 141, inverter follower 142, reset line 143, which passes into FIG. 4*e*; and by way of appropriate connections, this error signal, which is now down, is applied to switches 150, 151 and 152, which switches are included in the latch back path associated with the latches 228, 229 and 230, respectively. The effect of this is to disable the latch back circuits to cause the latch that was on to be turned off.

In the event the instruction modification is under control of the index adder, one of two latches; namely (I+0) latch 235 and (I+1) latch 236, would be on during the occurrence of the error, in which case a reset circuit would be effective to turn the latch in question off. This reset circuit includes the line 143, in FIG. 4*f*, which line passes the error signal, now down, to switches 153 and 154 forming a part of latch back circuits to the latches 235 and 236, respectively. It is further seen in FIG. 4*f* that (I+N) latch 237 is under the control of a pair of switches 155 and 156, which switches are influenced by the outputs of the latches 235 and 236, respectively.

During the course of a table lookup operation, the occurrence of a validity check error on Channel 2 turns on a table lookup carry latch 225 in FIG. 4*d*. The turn on circuit is by way of switch 125, Mix 126 and line 127. The latch stays on until the next word time when it is turned off upon the application of a negative word pulse (NWP) to the input of switch 280, which is in the latch back circuit of the latch. The turning off of the latch 225 provides an appropriate signal on line 281, to turn on the reset add D in accumulator A4, latch 226. The effect of this is to enable the address of the table lookup word to be inserted into the accumulator where it can then be examined for the purpose of determining the nature or source of the error. The entry of this address into the accomulator is effected in much the same way as the "found argument" is inserted into the accumulator during a normal table lookup operation, in the manner as explained in the afore-mentioned Hamilton et al. application.

For automatic recycling operation during table lookup, the address register is prevented from being reset by the provision of circuit means, shown in FIG. 4*f*, which means includes a switch 279 whose output is fed through the Mix 276 to inverter 277, whose down level output prevents the reset of the address register. The inputs to the switch 279 are table lookup carry and drum recycle. Thus, when coincidence in these signals is achieved, the address is prevented from being reset, thereby enabling the pertinent table lookup information to be recycled.

*Recycling Buffer Storage to General Storage and General Storage to Buffer Storage*

The recycling operation is also used to recycle data along Channel 1 from the buffer input section 1*a* of the drum to the general storage section 1*b*, in FIG. 2*a*. In this operation, the switches 287 and 288, in FIG. 2*a*, are controlled by appropriate buffer storage to general storage recycle controls 290, shown in box form. In like manner, the recycle operation is also used to recycle data along Channel 2 from general storage to buffer storage under control of switches 270 and 271, in turn controlled by appropriate recycle controls diagrammatically shown by a block 291. The recycling operation is similar to that described under recycling instruction data, the only difference being in the use of appropriate preliminary circuits to initiate activity of the circuitry comprising the recycling feature. For example, the manner of turning on the drum error latch 211 in FIG. 4*a* during a buffer storage to general storage recycling operation is effected by way of switch 263 in FIG. 4*a*. The inputs to this switch 263 comprise a digit 8 signal, a Channel 1 validity error signal and a drum read-in signal. The manner of turning the drum recycle latch 210 off is under control of switch 265. When recycling data from general storage to buffer storage by way of Channel 2, the latch 210 is turned off under control of switch 264.

While the invention has been particularly shown and described with reference to a preferred embodiment thereof, it will be understood by those skilled in the art that various changes in form and details may be made therein without departing from the spirit and scope of the invention.

What is claimed is:

1. In a computer having an adder and an accumulator for performing a series of arithmetic processes upon factors, or words, of data issued from a main storage under control of appropriate instructions, the adder having a pair of entry means into which a pair of factors are entered and processed in the adder and the results issued to an output thereof, the accumulator having an input means whereby one factor of a pair is stored and thereafter released for entry to the adder at the appropriate time that a second factor of the pair is also being entered into the adder, and further having first and second data channels, including switch means responsive to the appropriate instructions for transmitting the factors to the adder, one along the second channel to one of the adder entry means, and the other factor along the first channel connecting the output of the accumulator to the other entry of the adder, the combination comprising a supplemental register having switch means responsive to the appropriate instruction for connecting the input of said supplemental register to the first channel, whereby the factor issued from the accumulator register to the adder is also entered to said supplemental register; data error checking means for issuing an error signal upon the detection of an invalid factor enroute to the adder; and recycling means responsive to a detected error for reading out the factor in said supplemental register to the accumulator register and, upon completion of the readout, to effect retransmission and reprocessing of the same pair of factors by the adder.

2. In a computer having an adder and an accumulator for performing a series of arithmetic processes upon factors, or words, of data issued from a main storage under control of appropriate instructions, the adder having a pair of entry means into which a pair of factors are entered and processed in the adder and the results issued to an output thereof, the accumulator having an input means whereby one factor of a pair is stored and thereafter released for entry to the adder at the appropriate time that a second factor of the pair is also being entered into the adder, said accumulator further adapted to receive the results of the adder, and further having first and second data channels, including switch means responsive to the appropriate instructions, for transmitting the factors to the adder, one along the second channel to one of the adder entry means, and the other factor along the first channel connecting the output of the accumulator to the other entry of the adder, the combination comprising a supplemental register having switch means responsive to the appropriate instruction for connecting the input of said supplemental register to the first channel, whereby the factor issued from the accumulator register to the adder is also entered to said supplemental register; data error checking means for issuing an error signal upon the detection of an invalid factor enroute to the adder; and recycling means responsive to a detected error for reading out the factor in said supplemental register to the accumulator register, and upon completion of the readout, to effect retransmission and reprocessing of the same pair of factors by the adder and the accumulator.

3. In a computer operable in the serial mode and having a single digit adder and an accumulator for performing a series of arithmetic processes upon words of data, each constituted of digits, issued from a main storage under control of appropriate instructions, the adder having a pair of entry means into which a pair of words are entered serially by digit and processed in the adder and the results issued to an output thereof, the accumulator having an input means whereby one word of a pair is stored and thereafter released, serially by digit, for entry to the adder at the appropriate time that a second word of the pair is also being entered serially into the adder, said accumulater further adapted to receive the results of the adder, and further having first and second data channels, including switch means responsive to the appropriate instructions, for transmitting the words to the adder, one along the second channel to one of the adder entry means, and the other word along the first channel connecting the output of the accumulator to the other entry of the adder, the combination comprising a supplemental register having switch means responsive to the appropriate instruction for connecting the input of said supplemental register to the first channel whereby the word issued from the accumulator register to the adder is also entered serially to said supplemental register; data error checking means for issuing an error signal upon the detection of an invalid word enroute to the adder; and recycling means responsive to a detected error for reading out the word in said supplemental register to the accumulator register, and, upon completion of the readout, to effect retransmission and reprocessing of the same pair of words by the adder and the accumulator.

4. A computer as defined in claim 3 further characterized in that said main storage is comprised of a rotatable magnetic drum, and that said data error checking means is connected to said second channel.

5. In a computer of the class described, the combination comprising first and second data channels for transmitting a pair of words, an arithmetic device fed by said channels and adapted to effect an arithmetic process on the words received from said channels, a supplemental register connected to the first channel and adapted to store one of the words enroute to said arithmetic device so as to retain the original character of said one word, error detecting means connected to said second channel and adapted to issue an error signal in response to the detection of an invalid word, and recycling means responsive to said error signal and operable to release the retained word in said supplemental register and enter the same into said arithmetic device while concurrently effecting the re-entry of the second word to said adder, and thereupon to effect a repetition of the arithmetic process.

6. In a computer of the class described, the combination comprising first and second data channels for transmitting a pair of words, an arithmetic device fed by said channels and adapted to effect an arithmetic process on the words received from said channels, a supplemental register means connected to said channels and adapted to store the words enroute to said arithmetic device so as to retain the original character of said words, error detecting means connected to said channels and adapted to issue an error signal in response to the detection of an invalid word, and recycling means responsive to said error signal and operable to release the retained words in said supplemental register, and enter the same into said arithmetic device, and thereupon to effect a repetition of the arithmetic process.

7. In a computer having appropriate means to perform a series of logical operations under control of appropriate instructions stored in selected locations of a storage device, each instruction including an address portion which identifies the location of a succeeding instruction, the combination comprising a main data channel through which the instructions are transmitted; program means for initiating the transmission of said instructions, one at a time, in a programmed sequence; a program register connected to said channel and adapted to store the transmitted instructions, one at a time, for each logical operation to be performed; an address register adapted to store the address of the instruction stored in said program register; error detecting means connected to said main data channel and adapted to issue an error signal upon the detection of an invalid instruction; and recycling means operable in response to each such error signal to prevent the advance of said program means, to retain the address of the instruction detected to be invalid in order to provide for the retransmission of the last instruction to said program register, and to effect operation of the appropriate means operative in the logical operation performed so as to repeat the same operation.

8. In a computer as defined in claim 7 further characterized by the provision of a timer rendered operable by said recycling means to stop the computer in the event the error causing the recycling operation is not cleared up within the time interval set by said timer.

9. In a computer of the character described having a storage unit divided into a buffer and main sections respectively, and having data input means for loading the buffer with input data under control of appropriate loading instructions, the combination comprising means for initiating a loading of the buffer, including switches rendered operative by the appropriate instruction for transmitting the data to the buffer; a first data channel connecting the output of the buffer section to the input of the main storage section including switches rendered operative under control of the appropriate instruction to effect the transmission of buffered data to the main storage section; error detecting means connected to said first channel and adapted to issue an error signal in response to the detection of invalid transmitted buffered data; and recycling means responsive to such error signal and effective to retain the appropriate instruction, and render the switches in said first channel 1 operable to effect the retransmission of the buffered data to the main storage section.

10. In a computer as defined in claim 9 further characterized by the provision of a timer rendered operable by said recycling means to stop the computer in the event the error causing the recycling operation is not cleared up within the time interval set by said timer.

11. In a computer of the character described having a storage unit divided into a main and buffer sections, and in which the processed data of the computer is transmitted to the main section, the combination comprising a first data channel including switches rendered operative under control of appropriate instruction for transmitting the processed data to the main storage section; a second data channel including switches rendered operative under control of appropriate instruction for transmitting the processed data stored in the main section to the buffer section; error detecting means connected to said second channel and adapted to issue an error signal in response to the detection of invalid transmitted data; and recycling means responsive to such error signal and effective to retain the appropriate instruction, render the appropriate switches in said channel 2 operable to effect the retransmission of the processed data stored in the main section to the buffer section.

12. In a computer as defined in claim 11 further characterized by the provision of a timer rendered operable by said recycling means to stop the computer in the event the error causing the recycling operation is not cleared up within the time interval set by said timer.

13. In a computer of the class described having a main storage, an adder, and an accumulator connected by means including first and second data channels over which data words are transmitted and arithmetically processed in the adder, a pair of words at a time, under control of appropriate instructions fed to the computer, the combination comprising a re-add register including switch means rendered operable under control of appropriate instruction for connecting said re-add register to the first channel whereby the word being transmitted to and entered into the adder is also entered into said re-add register; error validity checking means connected to said second channel and operable to issue an error signal in response to the detection of an error in the transmission of the second word of the pair; and recycling means rendered operable in response to each error signal to effect the retention of the instruction causing the arithmetic process, the readout of the words stored in said re-add register and entry thereof into said accumulator, and thereupon to effect a repetition of the same arithmetic process by said adder under control of the retained instruction.

14. In a computer as defined in claim 13 further characterized by the provision of a timer rendered operable by said recycling means to stop the computer in the event the error causing the recycling operation is not cleared up within the time interval set by said timer.

15. In a computer of the class described, the combination comprising a data channel for transmitting a data word, an arithmetic device fed by said channel and adapted to effect an arithmetic process on the word received from said channel, a supplemental register means connected to said channel and adapted to store the word enroute to the arithmetic device so as to retain the original character of said word, error detecting means connected to said channel and adapted to issue an error signal in response to the detection of an invalid word, and recycling means responsive to said error signal and operable to transmit the retained word in said supplemental register to said arithmetic device to effect a repetition of the arithmetic process.

16. In a computer of the class described, the combination comprising a source of data, a data channel connected to said source for transmitting a data word, a storage device fed by said channel and adapted to store the word received from said channel, a supplemental register means connected to said channel and adapted to store the word transmitted to the storage device so as to retain the original character of said word, error detecting means connected to said channel and adapted to issue an error signal in response to the detection of a transmitted invalid word, and recycling means responsive to said error signal and operable to transmit the retained word in said supplemental register to said storage device to effect a repetition of the word transmission.

17. In a data processing system adapted to perform a variety of data processing operations on data under control of instructions stored in selected locations of a storage device, the combination comprising data issuing means for issuing data; a main data channel, and an instruction channel through which the data and the instructions respectively are transmitted; program means responsive to said instructions for effecting the transmission of said data, one at a time, in a programmed sequence; means responsive to said program means for rendering said data issuing means operative to issue data upon said main data channel; error detecting means connected to said main data channel and adapted to generate an error signal upon the detection of invalid transmitted data; and recycling means operable in response to each such generated error signal to prevent the advance of the program sequence in said program means so that only the current instruction is repeated to recycle the same operation.

18. In a data processing system adapted to perform a variety of data processing operations on data under control of instructions stored in selected locations of a storage device, the combination comprising data issuing means for issuing data; a main data channel, and an instruction channel through which the data and the instructions respectively are transmitted; program means responsive to said instructions for effecting the tarnsmission of said data, one at a time, in a programmed sequence; means responsive to said program means for rendering said data issuing means operative to issue data upon said main data channel; error detecting means connected to said main data channel and adapted to generate an error signal upon the detection of invalid transmitted data; recycling means operable in response to each such generated error signal to prevent the advance of the program sequence in said program means so that only the current instruction is repeated to recycle the same operation; and a timer rendered operable by said recycling means to start running for a predetermined time interval and upon termination of said time interval to interrupt data processing operations in the event the error causing the recycling operation is not cleared up within the time interval set by said timer.

References Cited in the file of this patent

UNITED STATES PATENTS 2,700,755 Burkhart ---------------- Jan. 25, 1955
2,789,759 Tootill et al. ------------ Apr. 23, 1957